(12) United States Patent
Arriola et al.

(10) Patent No.: US 7,956,132 B2
(45) Date of Patent: Jun. 7, 2011

(54) PRODUCTION OF TELECHELIC COMPOUNDS BY METATHESIS DEPOLYMERIZATION

(75) Inventors: Daniel J. Arriola, Midland, MI (US);
John R. Briggs, Midland, MI (US);
Francis J. Timmers, Midland, MI (US);
Nicole L. Wagner, Midland, MI (US);
Timothy T. Wenzel, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 157 days.

(21) Appl. No.: 12/377,037

(22) PCT Filed: Aug. 23, 2007

(86) PCT No.: PCT/US2007/018625
§ 371 (c)(1),
(2), (4) Date: Feb. 10, 2009

(87) PCT Pub. No.: WO2008/027269
PCT Pub. Date: Mar. 6, 2008

(65) Prior Publication Data
US 2010/0168352 A1    Jul. 1, 2010

Related U.S. Application Data

(60) Provisional application No. 60/840,308, filed on Aug. 25, 2006.

(51) Int. Cl.
*C08F 8/50* (2006.01)
*C08F 8/04* (2006.01)
*C08F 4/69* (2006.01)

(52) U.S. Cl. ........ 525/324; 525/123; 525/245; 525/247; 525/332.8; 525/338; 525/910; 525/911; 525/938

(58) Field of Classification Search .................. 525/245, 525/247, 324, 910, 911, 926, 332.8, 338, 525/938; 528/85
See application file for complete search history.

(56) References Cited

U.S. PATENT DOCUMENTS

| | | | |
|---|---|---|---|
| 3,692,872 A | 9/1972 | Calderon et al. | |
| 3,891,816 A | 6/1975 | Scott et al. | |
| 3,988,227 A * | 10/1976 | Eldred .......................... | 524/571 |
| 4,010,224 A | 3/1977 | Scott et al. | |
| 4,049,616 A | 9/1977 | Scott et al. | |
| 4,639,080 A * | 1/1987 | Kimura et al. ................ | 385/141 |
| 4,994,535 A | 2/1991 | Endo et al. | |
| 5,312,940 A | 5/1994 | Grubbs et al. | |
| 5,342,909 A | 8/1994 | Grubbs et al. | |
| 5,446,102 A | 8/1995 | Oziomek et al. | |
| 5,459,170 A | 10/1995 | Bleys et al. | |
| 5,559,190 A | 9/1996 | Nubel et al. | |
| 5,603,985 A | 2/1997 | Kent et al. | |
| 5,710,298 A | 1/1998 | Grubbs et al. | |
| 5,728,917 A | 3/1998 | Grubbs et al. | |
| 5,731,383 A | 3/1998 | Nubel et al. | |
| 5,750,815 A | 5/1998 | Grubbs et al. | |
| 5,840,820 A | 11/1998 | DeSimone et al. | |
| 5,917,071 A | 6/1999 | Grubbs et al. | |
| 5,977,393 A | 11/1999 | Grubbs et al. | |
| 6,313,332 B1 | 11/2001 | Grubbs et al. | |
| 6,353,141 B1 | 3/2002 | Zeller et al. | |
| 6,410,110 B1 | 6/2002 | Warner et al. | |
| 6,624,265 B2 | 9/2003 | Grubbs et al. | |
| 6,806,325 B2 | 10/2004 | Grubbs et al. | |
| 6,818,586 B2 | 11/2004 | Grubbs et al. | |
| 6,838,489 B2 | 1/2005 | Bell et al. | |
| 6,867,274 B2 | 3/2005 | Maughon et al. | |
| 7,022,789 B2 | 4/2006 | Maughon et al. | |

FOREIGN PATENT DOCUMENTS

| | | |
|---|---|---|
| CN | 1183422 | 6/1998 |
| DE | 2131355 | 1/1973 |
| DE | 2242794 | 3/1974 |
| DE | 146052 | 1/1981 |
| DE | 146053 | 1/1981 |
| EP | 1 251 135 | 10/2002 |
| WO | WO 2008/027267 | 3/2008 |
| WO | WO 2008/027268 | 3/2008 |
| WO | WO 2008/027283 | 3/2008 |

OTHER PUBLICATIONS

Hillmyer et al, Preparation of Hydroxytelechelic Poly(butadiene) via Ring-Opening Metathesis Polymerization Employing a Well-Defined Metathesis Catalyst, Macromolecules, 1993, 26, 872-884.*

Ishihara et al., "Communications to the Editor: Synthesis of Poly(propylene-ran-1,3-butadiene) and Its Metathesis Degradation with Ethylene", Macromolecules, Dec. 30, 2003, pp. 9675-9677,vol. 36, American Chemical Society.

Llauro et al., "Investigation of Ethylene/Butadiene Copolymers Microstructure by $^1$H and $^{13}$C NMR", Macromolecules, 2001, 6304-6311, vol. 34, No. 18, American Chemical Society.

Shiono et al., "Synthesis of a,ω-divinylpolyethylene-like polymers from cis-1,4-polybutadiene using a partial hydrogenation and metathesis degradation with ethylene", Makromol. Chem., Rapid Commun., 1993, pp. 323-327, vol. 14, No. 6, Hüthig & Wepf Verlag, Basel.

Streck, "Some Applications of the Olefin Metathesis Reaction to Polymer Synthesis*", Journal of Molecular Catalysis, 1982, pp. 3-19, vol. 15, Elsevier Sequoia.

Trzaska et al., "Synthesis of Narrow-Distribution "Perfect" Polyethylene and Its Block Copolymers by Polymerization of Cyclopentene", Macromolecules, 2000, pp. 9215-9221, vol. 33, No. 25, American Chemical Society.

Watson et al., "Solvent-Free Olefin Metathesis Depolymerization of 1,4-Polybutadiene", Macromolecules, 2000, pp. 1494-1496, vol. 33, American Chemical Society.

Hillmyer et al., "Preparation of Hydroxytelechelic Poly(butadiene) via Ring-Opening Metathesis Polymerization Employing a Well-Defined Metathesis Catalyst", Macromolecules, 1993, pp. 872-874, vol. 26.

* cited by examiner

*Primary Examiner* — Fred M Teskin
(74) *Attorney, Agent, or Firm* — The Dow Chemical Company; Marie F. Zuckerman; Claude F. Purchase

(57) ABSTRACT

Telechelic unsaturated polymers suitable for conversion to functionalized derivatives such as polyols are prepared by metathesis of an unsaturated copolymer formed by addition polymerization of ethylene, a diene or alkyne and, optionally, one or more $C_{3\text{-}20}$ α-olefins.

14 Claims, 2 Drawing Sheets

PRODUCTION OF TELECHELIC COMPOUNDS BY METATHESIS DEPOLYMERIZATION

CROSS-REFERENCE TO RELATED APPLICATIONS

This application is a 371 of International Patent Application No. PCT/US2007/018625, filed Aug. 23, 2007, which claims the benefit of U.S. Provisional Patent Application Ser. No. 60/840,308, filed Aug. 25, 2006.

BACKGROUND OF THE INVENTION

In one aspect, this invention relates to a process for preparing telechelic compounds by metathesis of high molecular weight olefin copolymers containing ethylenic unsaturation. In another aspect, this invention relates to telechelic compounds prepared by methathesis. The resulting products are ideally suited for use in production of polyurethanes, polyesters, epoxies, and other condensation polymer compositions, as reactive diluents for high solid content coating formulations, in cosmetic formulations, and in other applications due to their desirable balance of viscosity and functionality.

Telechelic compounds bear reactive terminal functional groups. Through these reactive end groups and functionalized derivatives thereof, a vast number of macromolecular materials can be prepared. Telechelic compounds have found application in the synthesis of block copolymers, star polymers, crosslinked polymer networks, and ionic polymer networks. Low molecular weight liquid telechelic polymers have been successfully used in reaction injection molding and in the formation of ABA triblock and multiblock copolymers.

Numerous olefin metathesis processes are previously known in the art. In general, olefin metathesis involves catalytic cleavage of one or more olefins at a point of unsaturation and recombination of the resulting cleavage products to form different olefin containing reaction products. Often, low molecular weight olefins and cyclic olefins, such as ethylene, cyclopentene or cyclooctene are employed as reagents in the foregoing reaction mixtures in order to provide low viscosity reaction mixtures, well defined reaction products, reduced molecular weight products, and/or mixtures suitable for reaction injection molding (RIM) compositions and elastomers. Metathesis of two or more different olefins is referred to as a "cross-metathesis". Examples of the foregoing processes are disclosed in U.S. Pat. Nos. 5,731,383, 4,994,535, 4,049,616, 3,891,816, 3,692,872, and elsewhere.

Preparation of linear polyethylene and poly(ethylidenenorbornene)/polycyclopentene diblock copolymers by ring opening metathesis of polycyclopentene or sequential polymerization of mixtures of ethylidenenorbornene and polycyclopentene was disclosed in *Macromol.*, 33(25), 9215-9221 (2000). In *Macromol.*, 33, 1494-1496 (2000), solid polymers were depolymerized by surface contact with a metathesis catalyst.

Functionalized polymers obtained through use of an appropriately functionalized cyclic or acyclic olefin chain transfer agent containing hydroxyl, ester, borane or reactive silyl functionality or through subsequent process steps may be employed to introduce the desired functionality into the polymers. Examples of such processes are disclosed by U.S. Pat. Nos. 6,867,274, 6,410,110, 5,603,985, 5,559,190, 5,446,102, 4,049,616, and other references.

In U.S. Pat. Nos. 3,692,872, 3,891,816 and 4,010,224 graft and block copolymers and interpolymers were prepared by metathesis of two polymers containing olefinic unsaturation, such as polybutadiene or polyisoprene. Monomers such as cyclooctene or dimers, such as cyclooctadiene-cyclopentadiene dimer, could be included in the polymerization as well. Similar processes involving the cross-metathesis of polybutadiene with polycyclooctene or polycyclododecene as well as grafting of EPDM polymers via metathesis were disclosed in DE 2,131,355 and DE 2,242,794. A summary of the work appeared in *J. Mol. Catal.*, 15, 3-19 (1982).

In *Macromol. Chem. Rapid Commun.* 14, 323-327 (1993) and *Macromol.*, 36, 9675-9677 (2003) the ethenolysis of partially hydrogenated polybutadiene and of propylene/1,3-butadiene copolymers were disclosed. The former process yielded α,ω-divinyl polyethylene oligomers containing a high internal ethylenic unsaturation (approximately one internal C=C bond in every two polymer chains). Studies of the latter product showed increased melting points for the metathesized reaction product presumably due to closer packing of the crystalline polymer segments.

Telechelic polymers with crosslinkable end groups such as hydroxy, acrylate or epoxide groups are useful for the preparation of interpenetrating polymer networks, crosslinked polymeric materials, coatings, encapsulating compositions, and for the immobilization of biomaterials. In U.S. Pat. No. 7,022,789, the depolymerization of copolymers prepared by ring opening metathesis polymerization (ROMP) of cyclooctadiene (COD) with either cis-4,7-dihydro-1,3-dioxepan or cis-4,7-dihydro-2-phenyl-1,3-dioxepan using ruthenium complexes, resulted in a polymer bearing both poly(butadiene) and acetal units along the backbone. Subsequent acid hydrolysis of these acetal units resulted in the formation of hydroxytelechelic poly(butadiene) (HTPBD) oligomers. Also disclosed was the direct preparation of telechelic polymers having crosslinkable end groups by reacting a functionalized chain transfer agent with a cycloalkene in the presence of certain ruthenium or osmium ROMP catalysts. Similar processes using difunctional olefins such as 2-butenedicarboxylic acid diesters under ROMP or metathesis degradation conditions were disclosed in German Democratic Republic patents DD 146,052 and DD 146,053, respectively. Suitable polymers for the latter process included, "1,4-cis-polybutadiene, and other copolymers as ABS rubber or SB rubber". According to U.S. Pat. No. 7,022,789, the products were polydisperse rubbers indicating the presence of cross-linking and containing undesirable quantities of vinyl groups.

The previously discussed processes utilized polybutadiene or similar polymers prepared by free radical techniques which possess undesirably high quantities of pendant vinyl groups (instead of terminal or internal unsaturation) due to uncontrolled 1,2-addition of the conjugated diene. This results in undesirably high levels of pendant vinyl functionality in the metathesis products and higher average functionality (greater than 2.0) unless extensive hydrogenation of the polymer is employed to first reduce the level of such pendant unsaturation. Polymer hydrogenation, however, is expensive and can result in loss of terminal unsaturation as well. Moreover, polybutadiene is known to be subject to rapid metathetical degradation and ring formation under metathesis conditions, resulting in formation of low molecular weight by-products of little commercial value.

It would be desirable if there were provided a process for the metathesis of unsaturated polymers that is specifically adapted for the formation of differentiated, commercially valuable telechelic products having desirable properties, especially low internal unsaturation for use in preparing functionalized derivatives such as polyols. It would further be desirable if the resulting products were suitable for use in preparing functionalized derivatives, especially polyols (diols), polyamines, polyesters and epoxides, having commercially valuable properties without the need for expensive partial hydrogenation of the initial reactants.

SUMMARY OF THE INVENTION

According to the present invention there is now provided a process for preparing a product mixture comprising telechelic polyenes, the steps of the process comprising contacting a metathesis catalyst under polymer metathesis conditions with a composition comprising the unsaturated copolymer formed by addition polymerization of ethylene, optionally one or more $C_{3-20}$ α-olefins, and a conjugated diene or alkyne in the presence of a cyclic olefin or polyolefin, an acyclic olefin, and/or a chain transfer agent, preferably ethylene; and recovering the resulting telechelic reaction product.

In a further embodiment there is provided a process for preparing a product mixture comprising functionalized telechelic compounds, the steps of the process comprising:

i) forming a mixture comprising telechelic polyenes by contacting a composition comprising an unsaturated copolymer formed by addition polymerization of ethylene, optionally one or more $C_{3-20}$ α-olefins, and a conjugated diene or alkyne, with a metathesis catalyst under polymer metathesis conditions in the presence of a cyclic olefin or polyolefin, an acyclic olefin, and/or a chain transfer agent, preferably ethylene, to form a polyunsaturated reaction product;

ii) converting some or all of the ethylenic unsaturation in the polyethylenically unsaturated reaction product to one or more functional groups, especially hydroxyl groups; and iii) recovering the resulting functionalized telchelic reaction product.

Highly desirably according to the present invention there is now provided a process for preparing a product mixture comprising aliphatic α,ω-diols, the steps of the process comprising:

i) contacting a metathesis catalyst under metathesis conditions with a composition comprising an unsaturated copolymer formed by addition polymerization of ethylene, optionally one or more $C_{3-20}$ α-olefins, and a conjugated diene or alkyne to prepare a polymer product comprising ethylenic unsaturation; and ii) hydroformylating the product mixture from step i) by contacting the same with carbon monoxide and a hydrogenating agent to form a product mixture comprising hydroxyl functionality.

In another embodiment of the invention, there is provided a product mixture comprising ethylenically unsaturated compounds, especially α,ω-dienes or functionalized derivatives thereof, preferably hydroxyl functionalized derivatives, prepared by or preparable according to one of the foregoing processes. Highly desired products have functionality (average number of functional groups per polymer) from 1.8 to 2.5, preferably from 1.9 to 2.2.

In another embodiment of the invention there is provided a process for the preparation of a polyurethane composition by reaction of a diisocyanate compound with a polyol, characterized in that the polyol comprises a composition according to the present invention or is prepared according to the process of the present invention. In a final embodiment of the invention there is provided a process for the preparation of a polyester composition by reaction of a dicarboxylic acid or a diester or anhydride derivative thereof with a polyol, characterized in that the polyol is a composition according to the present invention or prepared according to the process of the present invention. In one embodiment, the foregoing polyurethethane composition or polyester composition is a coating or encapsulating composition and the present telechelic compound comprises at least a portion of a reactive diluent.

Because the addition polymer formed by polymerization of ethylene, optionally one or more $C_{3-20}$ α-olefins, and a conjugated diene or alkyne can, through proper choice of catalyst, produce products that are inherently low in pendant vinyl functional groups, even prior to hydrogenation, the resulting metathesis products inherently possess high α,ω-unsaturation. For example, through selection of appropriate coordination catalysts and reaction conditions, the pendant vinyl functionality in the copolymer may be reduced to as low as 5 percent or less, preferably 2 percent or less, and more preferably 1 percent or less of the total ethylenic groups, and with hydrogenation, even lower levels of pendant vinyl unsaturation may be reached. The resulting metathesis products and functionalized derivatives thereof accordingly have a significantly reduced number of pendant vinyl groups and a corresponding reduced proclivity to form cross-links or pendant branches. Moreover, metathetic polymer degradation or ring formation is greatly reduced or eliminated. Desirably, functionalities from 1.8 to 2.5, preferably from 1.9 to 2.2 are attainable.

In the formation of polyols and other applications, low melting point (Tm less than 100° C., preferably less than 60° C.) or amorphous polymer segments are highly desired in order to provide advantaged product properties, especially good melt strength, moldability and flexibility of formed products. Such products can now be readily prepared according to the present invention.

DETAILED DESCRIPTION OF THE INVENTION

Figure 1:
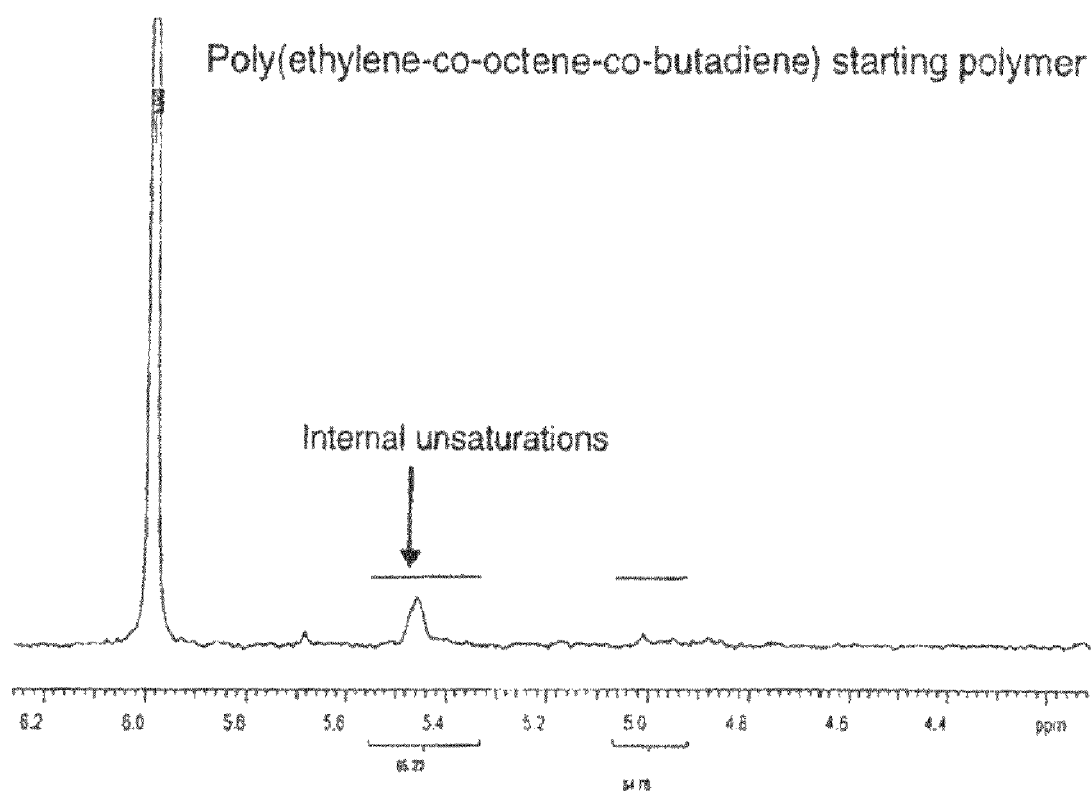
FIG. 1 is an $^1$H NMR spectrum of poly(ethylene-co-octene-co-butadiene) polymer that is used as a starting material in the metathesis process of Example 1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups disclosed in, *Nomenclature of Inorganic Chemistry: Recommendations* 1990, G. J. Leigh, Editor, Blackwell Scientific Publications (1990). Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more non-hydrocarbyl substituent groups. The term "heterocarbyl" refers to groups containing one or more carbon atoms and one or more heteroatoms and no hydrogen atoms. The bond between the carbon atom and any heteroatom as well as the bonds between any two heteroatoms may be a single or multiple covalent bond or a coordinating or other donative bond. Examples include trichloromethyl-, perfluorophenyl-, cyano- and isocyanato-groups. The terms "heteroatom containing hydrocarbyl" or "heterohydrocarbyl" refer to univalent groups in which at least one atom other than hydrogen or carbon is present along with one or more carbon atoms and one or more hydrogen atoms. Thus, an alkyl group substituted with a halo-, heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heterohydrocarbyl. Examples of suitable heteroalkyl groups include chloromethyl-, 2-cyanoethyl-, hydroxymethyl-, benzoylmethyl-, (2-pyridyl)methyl-, chlorobenzyl-, and trifluoromethyl-groups.

As used herein the term "aromatic" refers to a polyatomic, cyclic, conjugated ring system containing (4δ+2) π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, alkenyl, substituted alkyl, substituted alkenyl, cycloalkyl, substituted cycloalkyl, heterocycloalkyl, substituted heterocycloalkyl, halo, haloalkyl (for example, $CF_3$), hydroxy, amino, phosphido, alkoxy, amino, thio, nitro, and both saturated and unsaturated hydrocarbylene groups, including those which are fused to the aromatic ring(s), linked covalently or linked to a common group such as a methylene or ethylene moiety. The common linking group may also be carbonyl as in benzophenone-, oxygen as in diphenylether- or nitrogen as in diphenylamine-groups.

"Ethylenic unsaturation" or "ethylenic group" refers to adjacent aliphatic carbon atoms bound together by double bonds (non-aromatic $sp^2$ electronic hybridization), preferably of the formula: —CR*=CR*—, or —CR*=CR*$_2$, where R* independently each occurrence is hydrogen, halo, nitrile, hydrocarbyl, or substituted hydrocarbyl containing up to 20 atoms not counting hydrogen. Percent ethylenic unsaturation as used herein is calculated based on total carbon-carbon bond content of the polymer. The term "pendant" refers to groups or substituents attached to secondary or tertiary substituted carbons of the polymer. The term "terminal" refers to groups or substituents attached to a primary carbon of the polymer.

The term "polymer" as used herein refers to a macromolecular compound comprising multiple repeating units and a molecular weight of at least 100, preferably at least 1000. Preferably, at least one repeating unit occurs, consecutively or non-consecutively, 6 or more times, more preferably 20 or more times, on average. Molecules containing less than 6 such repeating units on average are referred to herein as oligomers. The term includes homopolymers, copolymers, terpolymers, interpolymers, and so on. The term "interpolymer" is used herein interchangeably with the term copolymer to refer to polymers incorporating in polymerized form at least two differentiated repeating units, usually obtained from separate copolymerizable monomers. The least prevalent monomer in the resulting copolymer or interpolymer is generally referred to by the term "comonomer".

The term, "segment(s)" refers to linear portions of an unsaturated polymer having a uniform composition and a carbon chain length of at least 12 carbons, preferably at least 20 carbons, more preferably at least 30 carbons, separated by ethylenic unsaturations or, in the case of a polymer comprising a single terminal unsaturation, terminated by the ethylenic unsaturation. Unsaturation occurring within a cyclic moiety, such as an alicyclic or aromatic group does not result in segment formation. The term "uniform composition" as used herein refers to segments that are derived from the same (co)monomer stream(s), the sequence and stereo-regularity in each segment being governed by the relative reactivity of each (co)monomer. Accordingly, the monomer sequence and stereo-regularity in any two or more segments may range from essentially identical to each other to substantially different from each other and any degree of variation in between these extremes.

The term "block copolymer" refers to a polymer having two or more identifiable sections thereof (blocks) that are chemically distinguishable from one another. The term "unsaturated block copolymer" refers to a block copolymer that comprises ethylenic unsaturation either between blocks or within one or more blocks thereof. An unsaturated polymer or an unsaturated block within a block copolymer may comprise one or more segments. The term "amorphous" refers to a polymer, polymer block or polymer segment (collectively referred to here-in-after as polymeric entities) lacking a crystalline melting point. The term "crystalline" refers to a polymeric entity possessing a crystalline melting point. The term "semi-crystalline" refers to a polymeric entity possessing a crystalline melting point which is lower than that of a fully crystalline or more fully crystalline polymer entity of the same chemical composition. More specifically, semi-crystalline as used herein, refers to polymer entities possessing crystallinity that is less than 90 percent of the maximum attainable crystallinity for that polymer entity. For the avoidance of doubt, the term crystalline includes semi-crystalline polymer entities.

The term "backbone" refers to the longest continuous polymeric chain of a polymer. All other polymer chains are referred to as side chains, branches, or grafted polymer chains. Short chains or short chain branching refers to branches from the backbone resulting from polymerization of monomers containing three or more carbons. Polymerization of monomers containing two or more ethylenic unsaturations can result in the formation of branches containing unsaturation. Metathesis of polymers containing such unsaturated branches can result in formation of products having branches that are pendant from the central backbone chain that are terminated with ethylenic unsaturation. The presence of such components in the product mixture may be used to compensate in part for the formation of a small quantity of monounsaturated products that also may form, or to increase the level of unsaturation in the product mixture. The resulting products and functionalized derivatives thereof, especially polyols, may be used to form crosslinked polymer networks, including polyurethanes or polyesters.

The term "elastomeric" refers to polymeric entities having a glassy transition temperature (Tg) less than 25° C., preferably less than 0° C. and elastic recovery of at least 90 percent when tested according to ASTM D-1708 at 21° C. Crystalline melting point (Tm) refers to the peak melting point determined by DSC according to ASTM D-3418 test method.

Suitable unsaturated polymer reagents employed in the present metathesis are copolymers prepared by addition polymerization of ethylene, optionally one or more $C_{3-20}$ α-olefins and a conjugated diene or alkyne, preferably copolymers of ethylene or a mixture of ethylene and a $C_{4-8}$ α-olefin with butadiene or isoprene. The resulting copolymers comprise ethylenic unsaturation in the remnant formed from polymerization of the diene or alkyne monomer. At least some of the ethylenic unsaturation, and preferably all or most of the ethylenic unsaturation in the reagent polymer is located in the main chain or backbone of the unsaturated polymer. When reacted with ethylene under metathesis conditions, such internal ethylenic unsaturation desirably results in formation of short chain, ethylenically terminated polymer segments. Desirably, the ethylenic content of the unsaturated polymer reagents is from 0.001 to less than 10 mole percent, more preferably from 0.01 to 5 mole percent. The quantity of ethylenic unsaturation in the polymer reagent may be adjusted prior to metathesis by partial hydrogenation, in order to attain α,ω-dienes of molecular weight ideally suited for subsequent conversion or use, especially for diol formation. It will be appreciated by the skilled artisan that by using unsaturated polymer reagents with higher unsaturation content, lower molecular weight products will result. For use as reactive diluents, the resulting telechelic products and functionalized derivatives thereof, especially α,ω-diols, have molecular weights from 500 to 10,000, more preferably from 550 to 1000 g/mole. For other uses such as functionalized reagents, the resulting telechelic products and functionalized derivatives thereof, especially α,ω-diols, have molecular weights from 10,000 to 1,000,000, more preferably from 50,000 to 100,000 g/mole. Accordingly, use of polymer reagents with adequate unsaturation to prepare telechelic products of the foregoing molecular weight ranges, is desired.

Examples of suitable unsaturated polymers for use as reagents or components of the reaction mixture herein include random copolymers, block copolymers, or pseudo-block copolymers of ethylene, optionally one or more $C_{3-20}$ olefin monomers and one or more diolefins; random-, block-, or pseudo-block-copolymers of ethylene, optionally one or more $C_{3-20}$ olefin monomers and one or more alkynes; random-, block- or pseudo-block-copolymers of ethylene, optionally one or more $C_{3-20}$ olefin monomers, one or more diolefins, and one or more alkynes; and partially hydrogenated derivatives of the foregoing. Most preferred reagents are random copolymers of ethylene, octene and a conjugated diene, especially 1,4-butadiene and partially hydrogenated derivatives thereof.

The unsaturated polymer reagents are desirably prepared by addition polymerization, suitably employing a Ziegler/Natta, metallocene, post-metallocene, or other coordination polymerization catalyst. By the term "Ziegler/Natta polymerization catalyst" is meant a catalyst composition suited for polymerization of olefins comprising an organometallic compound in which the metal is from groups 2, 12 or 13 of the Periodic Table of the Elements in combination with at least one other compound, especially a halide, oxide or oxyhalide, of a metal selected from groups 4, 5 or 6 of the Periodic Table of the Elements.

Due to the relative low unsaturation content of the polymer reagent, the segments participating in the present cross-metathesis desirably have a length (that is the average number of repeating monomer units) from 20 to 1000, preferably from 40 to 100, which corresponds to copolymers containing from about 0.1 to 5 mole percent polymerized diene or alkyne, preferably from 1 to 2.5 mole percent diene or alkyne. Further desirably, the remaining comonomer is ethylene or propylene, or a mixture of ethylene and one or more $C_{3-8}$ α-olefins.

The amount of ethylenic unsaturation in the reagent polymers can be determined by any suitable technique, such as iodine monochloride titration (ICl), NMR analysis or other technique. When appropriate, a combination of these techniques can be used. ICl titration is a well known technique for determining the level of carbon-carbon unsaturation in a wide variety of polymers wherein iodine monochloride is used to react with any unsaturations present in the polymer. The method does not distinguish between internal and terminal or vinyl unsaturation.

NMR spectroscopic analysis has particular utility for use with homopolymers and copolymers of conjugated dienes, due to the fact that the amount of internal unsaturation in the polymers (resulting from 1,4-addition of the diene) as opposed to vinyl unsaturation (resulting from 1,2-addition of the diene) may be determined using this technique. NMR techniques of polymer analysis include those disclosed in, *NMR and Macromolecules: sequence, dynamic and domain structure*, James C. Randall, ed.; ACS Symposium Series, 247; American Chemical Society, Washington, D.C. (1984).

The unsaturated reagent polymers may be readily prepared using standard addition polymerization techniques, such as by polymerizing an olefin mixture comprising one or more olefins in combination with at least one diene or alkyne using a coordination catalyst, especially a transition metal compound. Preferred polymers are ethylenically unsaturated copolymers formed by polymerization of a diene, preferably butadiene, with ethylene, or ethylene and one or more of butene, hexene or octene in an amount from 0 to 20 mole percent, especially 0-10 mole percent. More detailed description of the various methods of preparing the unsaturated polymer reagents follows.

Addition polymerization processes, such as transition metal catalyzed polymerizations more fully disclosed hereinafter, are compatible with a large number of monomers, normally excluding unprotected polar group containing monomers. Polymers made by polymerizing one or more addition polymerizable monomers along with a diene, preferably a conjugated alkadiene, especially 1,4-butadiene, and/or an alkyne compound, especially an acetylene derivative, form branched or linear polymers with primarily terminal and/or backbone unsaturation(s). Additionally, chain end unsaturation may result due to beta-hydride elimination and/or a small quantity of backbone unsaturation(s) may result from a random spontaneous dehydrogenation during the polymerization process. Parent unsaturated polymers made by addition polymerization processes can be partially hydrogenated to further limit the amount of ethylenic unsaturation and/or control the type of unsaturation, for example, by preferentially hydrogenating pendant vinyl groups.

A partial list of monomers suitably polymerized by addition polymerization techniques includes aliphatic and aromatic α-olefins and substituted olefins, conjugated and nonconjugated dienes, and cyclic olefins and polyolefins. Examples include: ethylene, propylene, 1-butene, 1-hexene, 1-octene, 4-methyl-1-pentene, acrylonitrile, methylmethacrylate, butylacrylate, styrene, vinylcyclohexane, α-methylstyrene, p-vinyltoluene, 1,3-butadiene, isoprene, 2,3-dimethyl-1,3-butadiene, 1,3-pentadiene, 1,3-hexadiene, 1,4-hexadiene, 1,5-hexadiene, 2,4-hexadiene, 2-methyl-3-ethyl-1,3-butadiene, 3-methyl-1,3-pentadiene, 2-methyl-3-ethyl-1,3-pentadiene, 2-ethyl-1,3-pentadiene, 3-methyl-1,3-heptadiene, 3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, chloroprene, fluoroprene, 2-methoxy-1,3-butadiene, 2-ethoxy-3-ethyl-1,3-butadiene, 2-ethoxy-3-methyl-1,3-hexadiene, decadiene, divinylbenzene, cyclohexene, vinylcyclohexene, benzocyclobutene, norbornene, norbornadiene, dicyclopentadiene, and ethylidene norbornene. Preferred monomers are ethylene, 1-octene and 1,3-butadiene. Most preferred unsaturated polymers for use in the present invention are polyolefinic hydrocarbons prepared by addition polymerization of ethylene, one or more $C_{2-20}$ olefins and a conjugated diene, especially butadiene or isoprene.

A preferred process for preparing unsaturated reagent polymers for use herein is the addition polymerization of ethylene, optionally one or more $C_{3-20}$ olefins and a diolefin. Suitable catalysts for such copolymerization include the well known transition metal based coordination catalysts previously disclosed for use in polymerizations of olefin monomers. Especially preferred catalysts comprise a Group 4 metal, especially zirconium or hafnium, and a heteroatom containing donor ligand. Desirable catalysts produce interpolymer products containing from 1 to 2 mole percent incorporated diene, principally inserted in 1,4-configuration. The presence of unsaturation in the polymer may be reduced by hydrogenation of the resulting interpolymer prior to contact with the metathesis catalyst. Desirably, the incidence of olefinic unsaturation in the unsaturated polymer is adjusted to between 0.01 and 0.1 mole percent. In determining such values, the ethylene units and any substituents on either carbon thereof are included in the theoretical weights of the ethylenic unit.

Examples of suitable Group 4 metal complexes useful as coordination catalyst components include complexes of transition metals selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine-, polyether-, or other polychelating base complexes. The complexes are generically depicted by the formula: $MK_kX_xZ_z$, or a dimer thereof, wherein M is a metal selected from Groups 3-15, preferably 3-10, more preferably 4-8, and most preferably Group 4 of the Periodic Table of the Elements;

K independently each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, trimethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylcnethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)-phenanthren-1-yl, and tetrahydroindenyl.

The boratabenzenyl ligands are anionic ligands which are boron containing analogues to benzene. They are previously known in the art having been described by G. Herberich, et al., in *Organometallics,* 14,1, 471-480 (1995). Preferred boratabenzenyl ligands correspond to the formula:

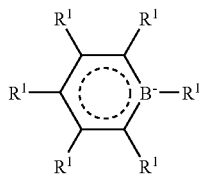

wherein $R^1$ is an inert substituent, preferably selected from the group consisting of hydrogen, hydrocarbyl, sibyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

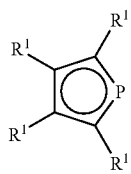

wherein $R^1$ is as previously defined.

Preferred transition metal complexes for use herein correspond to the formula: $MK_kX_xZ_z$, or a dimer thereof, wherein:

M is a Group 4 metal;

K is a group containing delocalized π-electrons through which K is bound to M, said K group containing up to 50 atoms not counting hydrogen atoms, optionally two K groups may be joined together forming a bridged structure, and further optionally one K may be bound to X or Z;

X each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy.

Examples of the complexes containing two K groups are compounds corresponding to the formula:

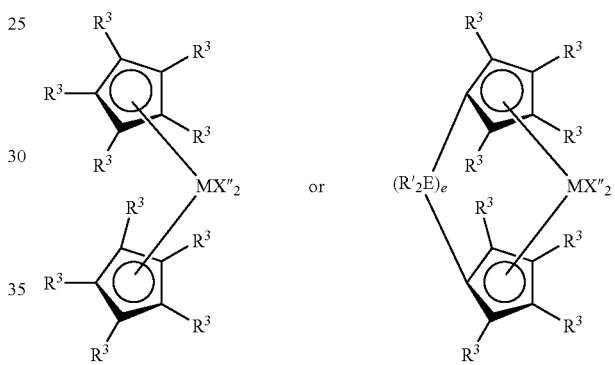

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)

(fluoren-1-yl)silane, dimethyl(cyclopentadienyl)(octahydrofluoren-1-yl)silane, dimethyl(cyclopentadienyl)(tetrahydrofluoren-1-yl)silane, (1,1,2,2-tetramethy)-1,2-bis(cyclopentadienyl)disilane, (1,2-bis(cyclopentadienyl)ethane, and dimethyl(cyclopentadienyl)-1-(fluoren-1-yl)methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

Examples of metal complexes of the foregoing formula include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiuramethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdichloride,
dimethylsilylbis(cyclopentadienyl)zirconiumdimethyl,
dimethylsilylbis(tetramethylcyclopentadienyl)titanium(III) allyl
dimethylsilylbis(t-butylcyclopentadienyl)zirconiumdichloride,
dimethylsilylbis(n-butylcyclopentadienyl)zirconiumdichloride,
(dimethylsilylbis(tetramethylcyclopentadienyl)titanium(III) 2-(dimethylamino)benzyl,
(dimethylsilylbis(n-butylcyclopentadienyl)titanium(III)2-(dimethylamino)benzyl,
dimethylsilylbis(indenyl)zirconiumdichloride,
dimethylsilylbis(indenyl)zirconiumdimethyl,
dimethylsilylbis(2-methylindenyl)zirconiumdimethyl,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium(II)1,4-diphenyl-1,3-butadiene,
dimethylsilylbis(4,5,6,7-tetrahydroinden-1-yl)zirconiumdichloride,
dimethylsilylbis(4,5,6,7-tetrahydroinden-1-yl)zirconiumdimethyl,
dimethylsilylbis(tetxahydroindenyl)zirconium(II)1,4-diphenyl-1,3-butadiene,
dimethylsilylbis(tetramethylcyclopentadienyl)zirconium dimethyl
dimethylsilylbis(fluorenyl)zirconiumdimethyl,
dimethylsilylbis(tetrahydrofluorenyl)zirconium bis(trimethylsilyl),
ethylenebis(indenyl)zirconiumdichloride,
ethylenebis(indenyl)zirconiumdimethyl,
ethylenebis(4,5,6,7-tetrahydroindenyl)zirconiumdichloride,
ethylenebis(4,5,6,7-tetrahydroindenyl)zirconiumdimethyl,
(isopropylidene)(cyclopentadienyl)(fluorenyl)zirconiumdibenzyl, and
dimethylsilyl(tetramethylcyclopentadienyl)(fluorenyl)zirconium dimethyl.

A further class of metal complexes utilized in addition polymerizations are compounds according to the preceding formula: $MKZ_zX_x$, or a dimer thereof, wherein M, K, X, x and z are as previously defined, and Z is a substituent of up to 50 non-hydrogen atoms that together with K forms a metallocycle with M.

Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes includes "constrained geometry catalysts" corresponding to the formula:

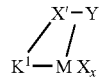

wherein:

M is titanium or zirconium, preferably titanium in the +2, +3, or +4 formal oxidation state;

$K^1$ is a delocalized, π-bonded ligand group optionally substituted with from 1 to 5 $R^2$ groups, $R^2$ in each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, hydrocarbyloxy or silyl group, said group having up to 20 non-hydrogen atoms, or two X groups together form a neutral $C_{5-30}$ conjugated diene or a divalent derivative thereof;

x is 1 or 2;

Y is —O—, —S—, —NR'—, —PR'—; and

X' is $SiR'_2$, $CR'_2$, $SiR'_2SiR'_2$, $CR'_2CR'_2$, $CR'=CR'$, $CR'_2SiR'_2$> or $GeR'_2$, wherein R' independently each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

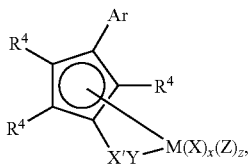

wherein,

Ar is an aryl group of from 6 to 30 atoms not counting hydrogen;

R⁴ independently each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent R⁴ groups may be joined together forming a polycyclic fused ring group;

M is titanium;

X' is $SiR^6_2$, $CR^6_2$, $SiR^6_2SiR^6_2$, $CR^6_2$, $CR^6_2$, $CR_6=CR_6$, $CR^6_2SiR^6_2$, $BR_6$, $BR_6L''$, or $GeR^6_2$;

Y is —O—, —S—, —NR⁵—, —PR⁵—; —NR⁵₂, or —PR⁵₂;

R⁵, independently each occurrence, is hydrocarbyl, trihydrocarbylsilyl, or trihydrocarbylsilylhydrocarbyl, said R⁵ having up to 20 atoms other than hydrogen, and optionally two R⁵ groups or R⁵ together with Y or Z form a ring system;

R⁶, independently each occurrence, is hydrogen, or a member selected from hydrocarbyl, hydrocarbyloxy, silyl, halogenated alkyl, halogenated aryl, —NR⁵₂, and combinations thereof, said R⁶ having up to 20 non-hydrogen atoms, and optionally, two R⁶ groups or R⁶ together with Z forms a ring system;

Z is a neutral diene or a monodentate or polydentate Lewis base optionally bonded to R⁵, R⁶, or X;

X is hydrogen, a monovalent anionic ligand group having up to 60 atoms not counting hydrogen, or two X groups are joined together thereby forming a divalent ligand group;

x is 1 or 2; and z is 0, 1 or 2.

Preferred examples of the foregoing metal complexes are substituted at both the 3- and 4-positions of a cyclopentadienyl or indenyl group with an Ar group.

Examples of the foregoing metal complexes include:
(3-phenylcyclopentadien-1-yl)dimethyl(t-butylamido)silanetitanium dichloride,
(3-phenylcyclopentadien-1-yl)dimethyl(t-butylamido)silanetitanium dimethyl,
(3-phenylcyclopentadien-1-yl)dimethyl(t-butylamido)silanetitanium(II)1,3-diphenyl-1,3-butadiene;
(3-(pyrrol-1-yl)cyclopentadien-1-yl)dimethyl(t-butylamido) silanetitanium dichloride,
(3-(pyrrol-1-yl)cyclopentadien-1-yl)dimethyl(t-butylamido) silanetitanium dimethyl,
(3-(pyrrol-1-yl)cyclopentadien-1-yl))dimethyl(t-butylamido)silanetitanium(II)1,4-diphenyl-1,3-butadiene;
(3-(1-methylpyrrol-3-yl)cyclopentadien-1-yl)dimethyl(t-butylamido)silanetitanium dichloride,
(3-(1-methylpyrrol-3-yl)cyclopentadien-1-yl)dimethyl(t-butylamido)silanetitanium dimethyl,
(3-(1-methylpyrrol-3-yl)cyclopentadien-1-yl)dimethyl(t-butylamido)silanetitanium(II)1,4-diphenyl-1,3-butadiene;
(3,4-diphenylcyclopentadien-1-yl)dimethyl(t-butylamido) silanetitanium dichloride,
(3,4-diphenylcyclopentadien-1-yl)dimethyl(t-butylamido) silanetitanium dimethyl,
(3,4-diphenylcyclopentadien-1-yl)dimethyl(t-butylamido) silanetitanium(II)1,3-pentadiene;
(3-(3-N,N-dimethylamino)phenyl)cyclopentadien-1-yl)dimethyl(t-butylamido)silanetitanium dichloride,
(3-(3-N,N-dimethylamino)phenylcyclopentadien-1-yl)dimethyl(t-butylamido)silanetitanium dimethyl,
(3-(3-N,N-dimethylamino)phenylcyclopentadien-1-yl)dimethyl(t-butylamido)silanetitanium (II)1,4-diphenyl-1,3-butadiene;
(3-(4-methoxyphenyl)-4-methylcyclopentadien-1-yl)dimethyl(t-butylamido)silanetitanium dichloride,
(3-(4-methoxyphenyl)-4-phenylcyclopentadien-1-yl)dimethyl(t-butylamido)silanetitanium dimethyl,
(3-(4-methoxyphenyl)-4-phenylcyclopentadien-1-yl)dimethyl(t-butylamido)silanetitanium(II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium(II)1,4-diphenyl-1,3-butadiene;
(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II)1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II)1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium(II)1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium(II)1,4-diphenyl-1,3-butadiene;
(3-phenyl-4-methoxycyclopentadien-1-yl)dimethyl(t-butylamido)silanetitanium dichloride, (3-phenyl-4-methoxycyclopentadien-1-yl)dimethyl(t-butylamido)silanetitanium dimethyl, (3-phenyl-4-methoxycyclopentadien-1-yl)dimethyl(t-butylamido)silanetitanium(II)1,4-diphenyl-1,3-butadiene;

(2,3-diphenyl-4-(n-butyl)cyclopentadien-1-yl)dimethyl(t-butylamido)silanetitanium dichloride, (2,3-diphenyl-4-(n-butyl)cyclopentadien-1-yl)dimethyl(t-butylamido)silanetitanium dimethyl, (2,3-diphenyl-4-(n-butyl)cyclopentadien-1-yl)dimethyl(t-butylamido)silanetitanium(II)1,4-diphenyl-1,3-butadiene;

(2,3,4,5-tetraphenylcyclopentadien-1-yl)dimethyl(t-butylamido)silanetitanium dichloride, (2,3,4,5-tetraphenylcyclopentadien-1-yl)dimethyl(t-butylamido)silanetitanium dimethyl, and (2,3,4,5-tetraphenylcyclopentadien-1-yl)dimethyl(t-butylamido)silanetitanium(II)1,4-diphenyl-1,3-butadiene.

Additional examples of suitable metal complexes for addition polymerizations are polycyclic complexes corresponding to the formula:

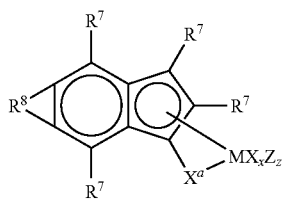

where M is titanium in the +2, +3 or +4 formal oxidation state;

$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylenephosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently each occurrence is a neutral ligating compound having up to 20 atoms;

x is 0, 1 or 2; and z is zero or 1.

Preferred examples of such complexes are 3-phenyl-substituted s-indecenyl complexes corresponding to the formula:

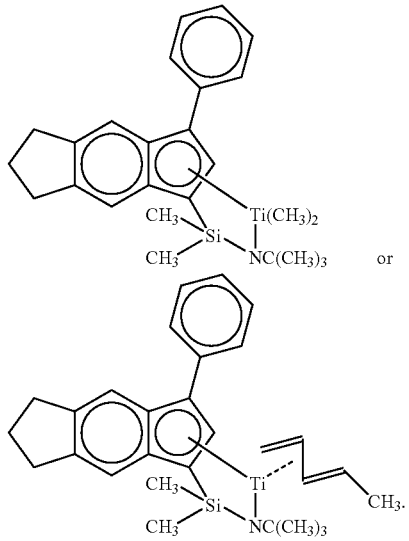

2,3-dimethyl-substituted s-indecenyl complexes corresponding to the formulas:

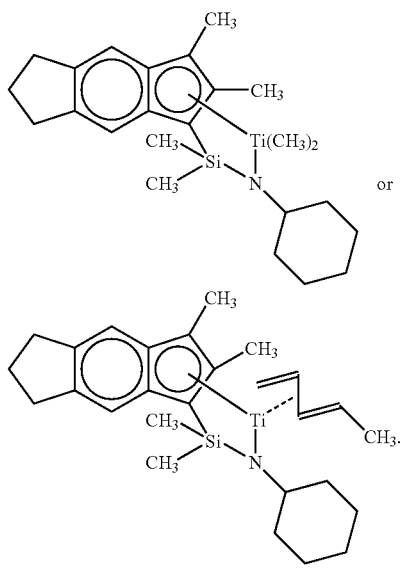

or 2-methyl-substituted s-indecenyl complexes corresponding to the formula:

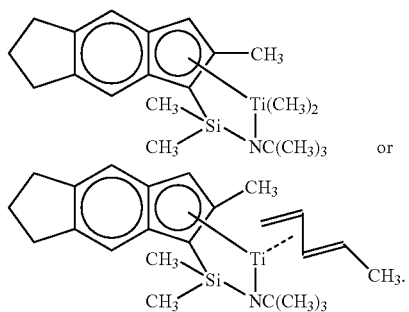

Additional examples of metal complexes that are usefully employed as catalyst (A) according to the present invention include those of the formula:

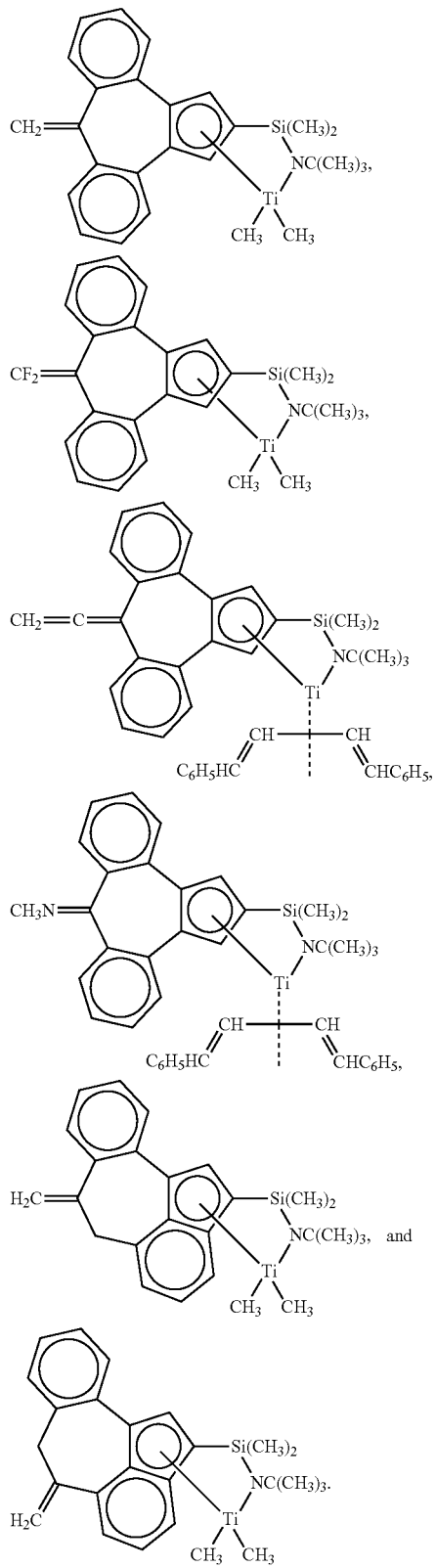

Specific metal complexes include:
(8-methylene-1,8-dihydrodibenzo[e,h]azulen-1-yl)-N-(1,1-dimethylethyl)dimethylsilanamide titanium(II)1,4-diphenyl-1,3-butadiene,
(8-methylene-1,8-dihydrodibenzo[e,h]azulen-1-yl)-N-(1,1-dimethylethyl)dimethylsilanamide titanium(II)1,3-pentadiene,
(8-methylene-1,8-dihydrodibenzo[e,h]azulen-1-yl)-N-(1,1-dimethylethyl)dimethylsilanamide titanium(III)2-(N,N-dimethylamino)benzyl,
(8-methylene-1,8-dihydrodibenzo[e,h]azulen-1-yl)-N-(1,1-dimethylethyl)dimethylsilanamide titanium(IV)dichloride,
(8-methylene-1,8-dihydrodibenzo[e,h]azulen-1-yl)-N-(1,1-dimethylethyl)dimethylsilanamide titanium(IV)dimethyl,
(8-methylene-1,8-dihydrodibenzo[e,h]azulen-1-yl)-N-(1,1-dimethylethyl)dimethylsilanamide titanium(IV)dibenzyl,
(8-difluoromethylene-1,8-dihydrodibenzo[e,h]azulen-1-yl)-N-(1,1-dimethylethyl)dimethylsilanamide titanium(II)1,4-diphenyl-1,3-butadiene,
(8-difluoromethylene-1,8-dihydrodibenzo[e,h]azulen-1-yl)-N-(1,1-dimethylethyl)dimethylsilanamide titanium(II)1,3-pentadiene,
(8-difluoromethylene-1,8-dihydrodibenzo[e,h]azulen-1-yl)-N-(1,1-dimethylethyl)dimethylsilanamide titanium(III)2-(N,N-dimethylamino)benzyl,
(8-difluoromethylene-1,8-dihydrodibenzo[e,h]azulen-1-yl)-N-(1,1-dimethylethyl)dimethylsilanamide titanium(IV) dichloride,
(8-difluoromethylene-1,8-dihydrodibenzo[e,h]azulen-1-yl)-N-(1,1-dimethylethyl)dimethylsilanamide titanium(IV) dimethyl,
(8-difluoromethylene-1,8-dihydrodibenzo[e,h]azulen-1-yl)-N-(1,1-dimethylethyl)dimethylsilanamide titanium(IV) dibenzyl,
(8-methylene-1,8-dihydrodibenzo[e,h]azulen-2-yl)-N-(1,1-dimethylethyl)dimethylsilanamide titanium(II)1,4-diphenyl-1,3-butadiene,
(8-methylene-1,8-dihydrodibenzo[e,h]azulen-2-yl)-N-(1,1-dimethylethyl)dimethylsilanamide titanium(II)1,3-pentadiene,
(8-methylene-1,8-dihydrodibenzo[e,h]azulen-2-yl)-N-(1,1-dimethylethyl)dimethylsilanamide titanium(III)2-(N,N-dimethylamino)benzyl,
(8-methylene-1,8-dihydrodibenzo[e,h]azulen-2-yl)-N-(1,1-dimethylethyl)dimethylsilanamide titanium(IV)dichloride,
(8-methylene-1,8-dihydrodibenzo[e,h]azulen-2-yl)-N-(1,1-dimethylethyl)dimethylsilanamide titanium(IV)dimethyl,
(8-methylene-1,8-dihydrodibenzo[e,h]azulen-2-yl)-N-(1,1-dimethylethyl)dimethylsilanamide titanium(IV)dibenzyl,
(8-difluoromethylene-1,8-dihydrodibenzo[e,h]azulen-2-yl)-N-(1,1-dimethylethyl)dimethylsilanamide titanium(II)1,4-diphenyl-1,3-butadiene,
(8-difluoromethylene-1,8-dihydrodibenzo[e,h]azulen-2-yl)-N-(1,1-dimethylethyl)dimethylsilanamide titanium(II)1,3-pentadiene,
(8-difluoromethylene-1,8-dihydrodibenzo[e,h]azulen-2-yl)-N-(1,1-dimethylethyl)dimethylsilanamide titanium(III)2-(N,N-dimethylamino)benzyl,
(8-difluoromethylene-1,8-dihydrodibenzo[e,h]azulen-2-yl)-N-(1,1-dimethylethyl)dimethylsilanamide titanium(IV) dichloride,
(8-difluoromethylene-1,8-dihydrodibenzo[e,h]azulen-2-yl)-N-(1,1-dimethylethyl)dimethylsilanamide titanium(IV) dimethyl, (8-difluoromethylene-1,8-dihydrodibenzo[e,h]azulen-2-yl)-N-(1,1-dimethylethyl)dimethylsilanamide titanium(IV) dibenzyl, and mixtures thereof, especially mixtures of positional isomers.

Further illustrative examples of metal complexes for use in addition polymerizations correspond to the formula:

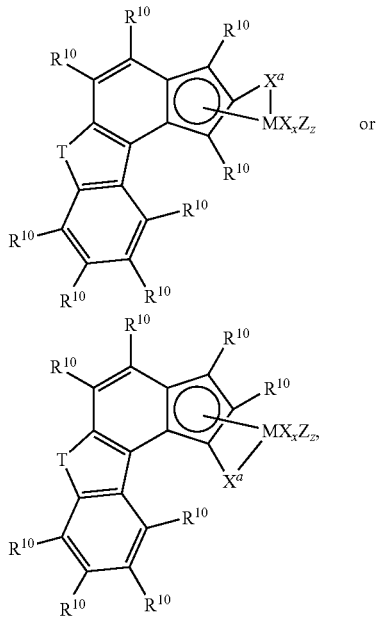

where M is titanium in the +2, +3 or +4 formal oxidation state;

T is —$NR^9$— or —O—;

$R^9$ is hydrocarbyl, silyl, germyl, dihydrocarbylboryl, or halohydrocarbyl or up to 10 atoms not counting hydrogen;

$R^{10}$ independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^{10}$ group having up to 40 atoms not counting hydrogen atoms, and optionally two or more of the foregoing adjacent $R^{10}$ groups may together form a divalent derivative thereby forming a saturated or unsaturated fused ring;

$X^a$ is a divalent moiety lacking in delocalized π-electrons, or such a moiety comprising one σ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2, or 3; and z is 0 or 1.

Highly preferably T is =$N(CH_3)$, X is halo or hydrocarbyl, x is 2, X' is dimethylsilane, z is 0, and $R^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two $R^{10}$ groups may be joined together.

Illustrative metal complexes of the foregoing formula include the following compounds:

(t-butylamido)dimethyl-[6,7]benzo-[4,5:2',3'](1-methylisoindol)-(3H)-indene-2-yl)silanetitanium(II)1,4-diphenyl-1,3-butadiene, (t-butylamido)dimethyl-[6,7]benzo-[4,5:2',3'](1-methylisoindol)-(3H)-indene-2-yl)silanetitanium(II)1,3-pentadiene, (t-butylamido)dimethyl-[6,7]benzo-[4,5:2',3'](1-methylisoindol)-(3H)-indene-2-yl)silanetitanium(III)2-(N,N-dimethylamino)benzyl, (t-butylamido)dimethyl-[6,7]benzo-[4,5:2',3'](1-methylisoindol)-(3H)-indene-2-yl)silanetitanium(IV)dichloride, (t-butylamido)dimethyl-[6,7]benzo-[4,5:2',3'](1-methylisoindol)-(3H)-indene-2-yl)silanetitanium(IV)dimethyl, (t-butylamido)dimethyl-[6,7]benzo-[4,5:2',3'](1-methylisoindol)-(3H)-indene-2-yl)silanetitanium(IV)dibenzyl, (t-butylamido)dimethyl-[6,7]benzo-[4,5:2',3'](1-methylisoindol)-(3H)-indene-2-yl)silanetitanium(IV)bis(trimethylsilyl), (cyclohexylamido)dimethyl-[6,7]benzo-[4,5:2',3'](1-methylisoindol)-(3H)-indene-2-yl)silanetitanium(II)1,4-diphenyl-1,3-butadiene, (cyclohexylamido)dimethyl-[6,7]benzo-[4,5:2',3'](1-methylisoindol)-(3H)-indene-2-yl)silanetitanium(II)1,3-pentadiene, (cyclohexylamido)dimethyl-[6,7]benzo-[4,5:2',3'](1-methylisoindol)-(3H)-indene-2-yl)silanetitanium(III)2-(N,N-dimethylamino)benzyl, (cyclohexylamido)dimethyl-[6,7]benzo-[4,5:2',3'](1-methylisoindol)-(3H)-indene-2-yl)silanetitanium(IV)dichloride, (cyclohexylamido)dimethyl-[6,7]benzo-[4,5:2',3'](1-methylisoindol)-(3H)-indene-2-yl)silanetitanium(IV)dimethyl, (cyclohexylamido)dimethyl-[6,7]benzo-[4,5:2',3'](1-methyl isoindol)-(3H)-indene-2-yl)silanetitanium(IV)dibenzyl, (cyclohexylamido)dimethyl-[6,7]benzo-[4,5:2',3'](1-methylisoindol)-(3H)-indene-2-yl)silanetitanium(IV)bis(trimethylsilyl), (t-butylamido)di(p-methylphenyl)-[6,7]benzo-[4,5:2',3'](1-methylisoindol)-(3H)-indene-2-yl)silanetitanium(II)1,4-diphenyl-1,3-butadiene, (t-butylamido)di(p-methylphenyl)-[6,7]benzo-[4,5:2',3'](1-methylisoindol)-(3H)-indene-2-yl)silanetitanium(II)1,3-pentadiene, (t-butylamido)di(p-methylphenyl)-[6,7]benzo-[4,5:2',3'](1-methylisoindol)-(3H)-indene-2-yl)silanetitanium(III)2-(N,N-dimethylamino)benzyl, (t-butylamido)di(p-methylphenyl)-[6,7]benzo-[4,5:2',3'](1-methylisoindol)-(3H)-indene-2-yl)silanetitanium(IV) dichloride, (t-butylamido)di(p-methylphenyl)-[6,7]benzo-[4,5:2',3'](1-methylisoindol)-(3H)-indene-2-yl)silanetitanium(IV) dimethyl, (t-butylamido)di(p-methylphenyl)-[6,7]benzo-[4,5:2',3'](1-methylisoindol)-(3H)-indene-2-yl)silanetitanium(IV) dibenzyl, (t-butylamido)di(p-methylphenyl)-[6,7]benzo-[4,5:2',3'](1-methylisoindol)-(3H)-indene-2-yl)silanetitanium(IV)bis(trimethylsilyl),
(cyclohexylamido)di(p-methylphenyl)-[6,7]benzo-[4,5:2',3'](1-methylisoindol)-(3H)-indene-2-yl)silanetitanium(II) 1,4-diphenyl-1,3-butadiene,
(cyclohexylamido)di(p-methylphenyl)-[6,7]benzo-[4,5:2',3'](1-methylisoindol)-(3H)-indene-2-yl)silanetitanium(II) 1,3-pentadiene,
(cyclohexylamido)di(p-methylphenyl)-[6,7]benzo-[4,5:2',3'](1-methylisoindol)-(3H)-indene-2-yl)silanetitanium(III)2-(N,N-dimethylamino)benzyl,
(cyclohexylamido)di(p-methylphenyl)-[6,7]benzo-[4,5:2',3'](1-methylisoindol)-(3H)-indene-2-yl)silanetitanium(IV)dichloride,
(cyclohexylamido)di(p-methylphenyl)-[6,7]benzo-[4,5:2',3'](1-methylisoindol)-(3H)-indene-2-yl)silanetitanium(IV)dimethyl,
(cyclohexylamido)di(p-methylphenyl)-[6,7]benzo-[4,5:2',3'](1-methylisoindol)-(3H)-indene-2-yl)silanetitanium(IV)dibenzyl; and
(cyclohexylamido)di(p-methylphenyl)-[6,7]benzo-[4,5:2',3'](1-methylisoindol)-(3H)-indene-2-yl)silanetitanium(IV)bis(trimethylsilyl).

Additional examples of Group 4 metal complexes include:
(tert-butylamido)(1-dimethyl-2,3,4,9,10-η-1,4,5,6,7,8-hexahydronaphthalenyl)dimethylsilanetitaniumdimethyl,
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-$\eta^5$-cyclopentadienyl)dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium(III)2-(dimethylamino)benzyl;
(tert-butylamido)(tetramethyl-$\eta^5$-cyclopentadienyl)dimethylsilanetitanium(III)allyl,
(tert-butylamido)(tetramethyl-$\eta^5$-cyclopentadienyl)dimethylsilanetitanium(III)2,4-dimethylpentadienyl,
(tert-butylamido)(tetramethyl-$\eta^5$-cyclopentadienyl)dimethylsilanetitanium(II)1,4-diphenyl-1,3-butadiene,
(tert-butylamido)(tetramethyl-$\eta^5$-cyclopentadienyl)dimethylsilanetitanium(II)1,3-pentadiene,
(tert-butylamido)(2-methylindenyl)dimethylsilanetitanium(II)1,4-diphenyl-1,3-butadiene,
(tert-butylamido)(2-methylindenyl)dimethylsilanetitanium(II)2,4-hexadiene,
(tert-butylamido)(2-methylindenyl)dimethylsilanetitanium(IV)2,3-dimethyl-1,3-butadiene,
(tert-butylamido)(2-methylindenyl)dimethylsilanetitanium(IV)isoprene,
(tert-butylamido)(2-methylindenyl)dimethylsilanetitanium(IV)1,3-butadiene,
(tert-butylamido)(2,3-dimethylindenyl)dimethylsilanetitanium(IV)2,3-dimethyl-1,3-butadiene,
(tert-butylamido)(2,3-dimethylindenyl)dimethylsilanetitanium(IV)isoprene
(tert-butylamido)(2,3-dimethylindenyl)dimethylsilanetitanium(IV)dimethyl
(tert-butylamido)(2,3-dimethylindenyl)dimethylsilanetitanium(IV)dibenzyl
(tert-butylamido)(2,3-dimethylindenyl)dimethylsilanetitanium(IV)1,3-butadiene,
(tert-butylamido)(2,3-dimethylindenyl)dimethylsilanetitanium(II)1,3-pentadiene,
(tert-butylamido)(2,3-dimethylindenyl)dimethylsilanetitanium(II)1,4-diphenyl-1,3-butadiene,
(tert-butylamido)(2-methylindenyl)dimethylsilanetitanium(II)1,3-pentadiene,
(tert-butylamido)(2-methylindenyl)dimethylsilanetitanium(IV)dimethyl,
(tert-butylamido)(2-methylindenyl)dimethylsilanetitanium(IV)dibenzyl,
(tert-butylamido)(2-methyl-4-phenylindenyl)dimethylsilanetitanium(II)1,4-diphenyl-1,3-butadiene,
(tert-butylamido)(2-methyl-4-phenylindenyl)dimethylsilanetitanium(II)1,3-pentadiene,
(tert-butylamido)(2-methyl-4-phenylindenyl)dimethylsilanetitanium(II)2,4-hexadiene,
(tert-butylamido)(tetramethyl-$\eta^5$-cyclopentadienyl)dimethyl-silanetitanium(IV)1,3-butadiene,
(tert-butylamido)(tetramethyl-$\eta^5$-cyclopentadienyl)dimethylsilanetitanium(IV)2,3-dimethyl-1,3-butadiene,
(tert-butylamido)tetramethyl-$\eta^5$-cyclopentadienyl)dimethylsilanetitanium(IV)isoprene,
(tert-butylamido)(tetramethyl-$\eta^5$-cyclopentadienyl)dimethyl-silanetitanium(II)1,4-dibenzyl-1,3-butadiene,
(tert-butylamido)(tetramethyl-$\eta^5$-cyclopentadienyl)dimethylsilanetitanium(II)2,4-hexadiene,
(tert-butylamido)(tetramethyl-$\eta^5$-cyclopentadienyl)dimethyl-silanetitanium(II)3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-η-1,4,5,6,7,8-hexahydronaphthalen-4-yl)dimethylsilanetitaniumdimethyl,
(tert-butylamido)(1,1,2,3-tetramethyl-2,3,4,9,10-η-1,4,5,6,7,8-hexahydronaphthalen-4-yl)dimethylsilanetitaniumdimethyl
(tert-butylamido)(tetramethyl-$\eta^5$-cyclopentadienyl methylphenylsilanetitanium(IV)dimethyl,
(tert-butylamido)(tetramethyl-$\eta^5$-cyclopentadienyl methylphenylsilanetitanium(II)1,4-diphenyl-1,3-butadiene,
1-(tert-butylamido)-2-(tetramethyl-$\eta^5$-cyclopentadienyl) ethanediyltitanium(IV)dimethyl, and
1-(tert-butylamido)-2-(tetramethyl-$\eta^5$-cyclopentadienyl) ethanediyl-titanium(II)1,4-diphenyl-1,3-butadiene.

Other delocalized, π-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes for addition polymerizations are metal complexes of polyvalent Lewis bases, such as compounds of the formulas:

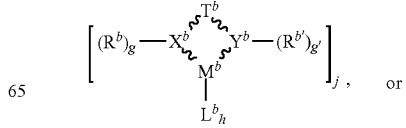

-continued

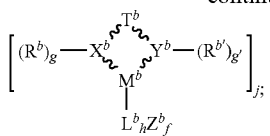

preferably

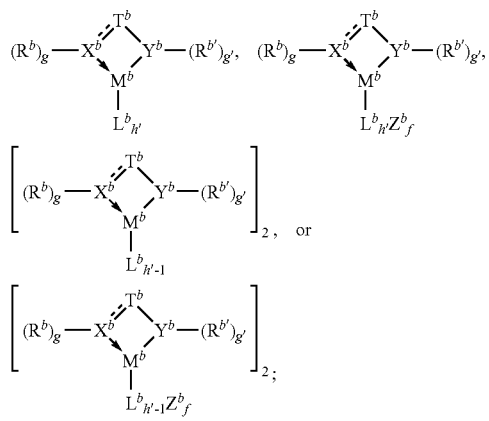

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b'}$ independently each occurrence are hydrogen or $C_{1-50}$ hydrocarbyl groups optionally containing one or more heteroatoms or inertly substituted derivative thereof. Non-limiting examples of suitable $R^b$ and $R^{b'}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable $R^b$ and $R^{b'}$ groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g is 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are $C_{1-20}$ alkyl, $C_{7-20}$ aralkyl, and chloride;

h is an integer from 1 to 6, preferably from 1 to 4, more preferably from 1 to 3, and j is 1 or 2, with the value h×j selected to provide charge balance;

$Z^b$ is a neutral ligand group coordinated to $M^b$, and containing up to 50 atoms not counting hydrogen Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b'}$ may be joined together to form a single or multiple ring structure;

h is an integer from 1 to 6, preferably from 1 to 4, more preferably from 1 to 3;

~~~indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are $C_{1-8}$ straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl of alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

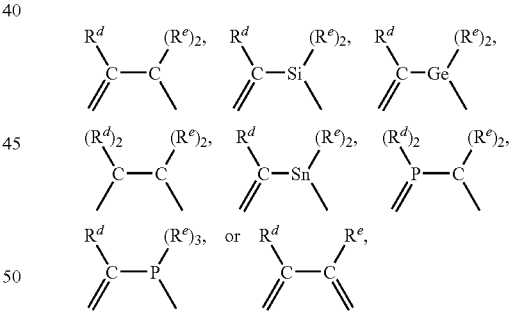

wherein

Each $R^d$ is $C_{1-10}$ hydrocarbyl group, preferably methyl, ethyl, n-propyl, i-propyl, t-butyl, phenyl, 2,6-dimethylphenyl, benzyl, or tolyl. Each $R^e$ is $C_{1-10}$ hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Preferred examples of the foregoing polyvalent Lewis base complexes include:

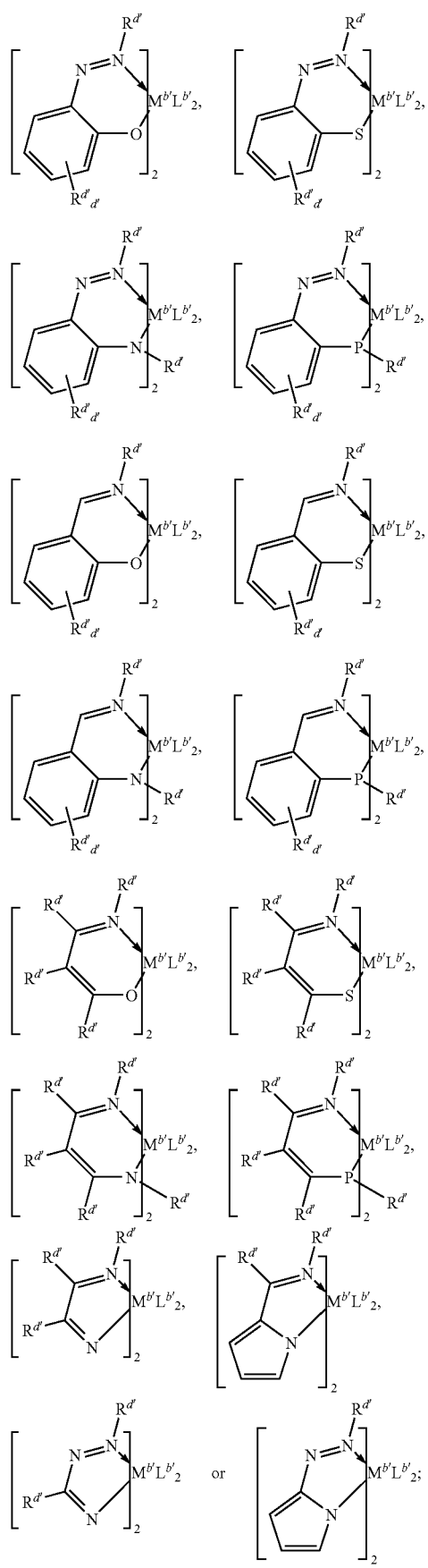

wherein $R^{d1}$ each occurrence is independently selected from the group consisting of hydrogen and $C_{1-50}$ hydrocarbyl groups optionally containing one or more heteroatoms, or inertly substituted derivative thereof, or further optionally, two adjacent $R^{d1}$ groups may together form a divalent bridging group;

d' is 4;

$M^{b1}$ is a Group 4 metal, preferably titanium or hafnium, or a Group 10 metal, preferably Ni or Pd;

$L^{b1}$ is a monovalent ligand of up to 50 atoms not counting hydrogen, preferably halide or hydrocarbyl, or two $L^{b1}$ groups together are a divalent or neutral ligand group, preferably a $C_{2-50}$ hydrocarbylene, hydrocarbadiyl or diene group.

The polyvalent Lewis base complexes additionally include Group 4 metal derivatives, especially hafnium derivatives of hydrocarbylamine substituted heteroaryl compounds corresponding to the formula:

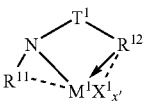

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably zirconium or hafnium;

$X^1$ is an anionic; neutral or dianionic ligand group;

x' is a number from 0 to 5 indicating the number of such $X^1$ groups; and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Preferred metal complexes correspond to the formula:

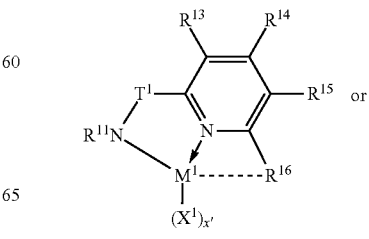

-continued

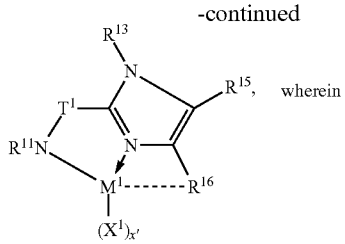

wherein $M^1$, $X^1$, x', $R^{11}$ and $T^1$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and bonds, optional bonds and electron pair donative interactions are represented by lines, dotted lines and arrows respectively.

More preferred examples of the foregoing metal complexes correspond to the formula:

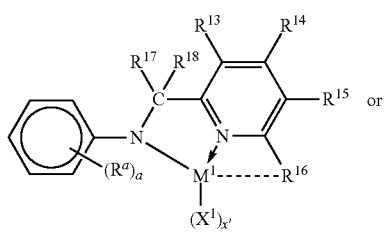

$M^1$, $X^1$, and x' are as previously defined, $R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl;

$R^a$ independently each occurrence is $C_{1-4}$ alkyl, and a is 1-5, most preferably $R^a$ in two ortho-positions to the nitrogen is isopropyl or t-butyl;

$R^{17}$ and $R^{18}$ independently each occurrence are hydrogen, halogen, or a $C_{1-20}$ alkyl or aryl group, most preferably one of $R^{17}$ and $R^{18}$ is hydrogen and the other is a $C_{6-20}$ aryl group, especially 2-isopropyl, phenyl or a fused polycyclic aryl group, most preferably an anthracenyl group, and bonds, optional bonds and electron pair donative interactions are represented by lines, dotted lines and arrows respectively.

Highly preferred amine donor metal complexes correspond to the formula:

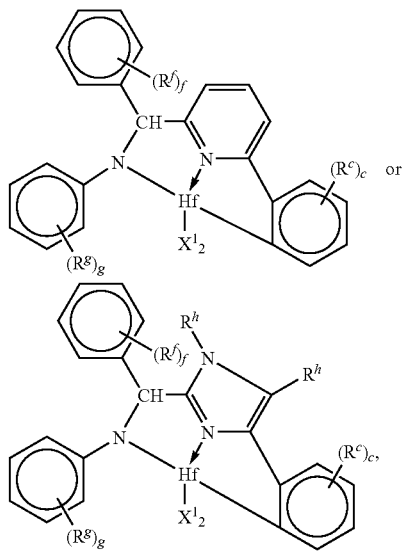

wherein $X^1$ each occurrence is halide, N,N-dimethylamido, or $C_{1-4}$ alkyl, and preferably each occurrence $X^1$ is methyl;

$R^c$, $R^f$ and $R^g$ independently each occurrence are halogen, $C_{1-20}$ alkyl, or $C_{6-20}$ aryl, or two adjacent $R^c$, $R^f$ or $R^g$ groups are joined together thereby forming a ring, c is and integer from 1 to 4, and f and g, independently is integers from 1-5; and $R^h$ independently each occurrence is hydrogen or $C_{1-6}$ alkyl.

Most highly preferred examples of such amine donor metal complexes are compounds of the formulas:

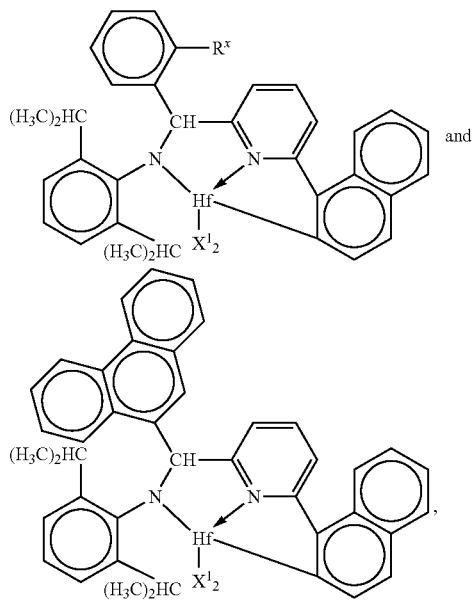

wherein $R^x$ is $C_{1-4}$ alkyl or cycloalkyl, preferably methyl, isopropyl, t-butyl or cyclohexyl; and $X^1$ each occurrence is halide, N,N-dimethylamido, or $C_{1-4}$ alkyl, preferably methyl.

Examples include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)]hafnium dimethyl;

[N-(2,6-di(1-methylethyl)phenyl)amido)(2-isopropylphenyl)(α-naphthalen-2-diyl(6-pyridin-2-diyl)methane)]hafnium di(N,N-dimethylamido);

[N-(2,6-di(1-methylethyl)phenyl)amido)(2-isopropylphenyl)(α-naphthalen-2-diyl(6-pyridin-2-diyl)methane)]hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido);

[N-(2,6-di(1-methylethyl)phenyl)amido)(phenanthren-5-yl)(α-naphthalen-2-diyl(6-pyridin-2-diyl)methane)]hafnium dichloride;

[N-[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$, κ$N^2$]hafnium dimethyl,

[N-[2,6-bis(1-methylethyl)phenyl]-α-[2-(1-methylethyl)phenyl]-6-(1,2-naphthalenyl-κ-$C^2$)-2-pyridinemethanaminato (2-)-κ$N^1$, κ$N^2$]hafnium di(n-butyl);

[N-[2,6-bis(1-methylethyl)phenyl]-α-[2,6-bis(1-methylethyl)phenyl]-6-(1,2-naphthalendiyl-κ-$C^2$)-2-pyridinemethanaminato (2-)-κ$N^1$, κ$N^2$]hafnium dimethyl,

[N-[2,6-bis(1-methylethyl)phenyl]-α-[2,6-bis(1-methylethyl)phenyl]-6-(1,2-naphthalenyl-κ-$C^2$)-2-pyridinemethanaminato (2-)-κ$N^1$, κ$N^2$]hafnium di(n-butyl)

[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$]hafnium dimethyl,

[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$]hafnium di(n-butyl),

[N-[2,4,6-tris(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$]hafnium di(methyl), and

[N-[2,4,6-tris(1-methylethyl)phenyl]-α-[2,6-bis(1-methylethyl)phenyl]-6-(1,2-naphthalenyl-κ-$C^2$)-2-pyridinemethanaminato (2-)-κ$N^1$, κ$N^2$]hafnium di(n-butyl).

Additional suitable metal complexes of polyvalent Lewis bases include polyether compounds corresponding to the formula:

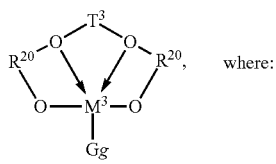, where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

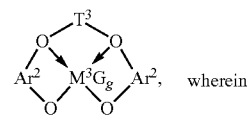 wherein $T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Examples of metal complexes of foregoing formula include the following compounds:

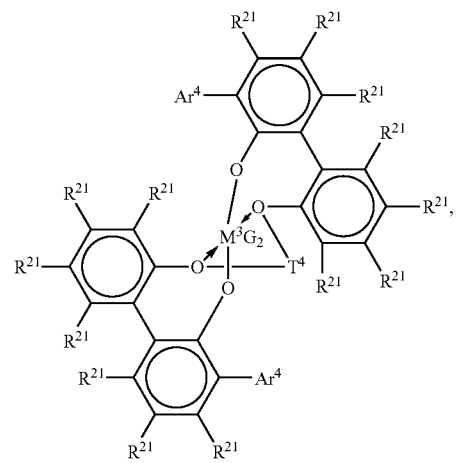

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

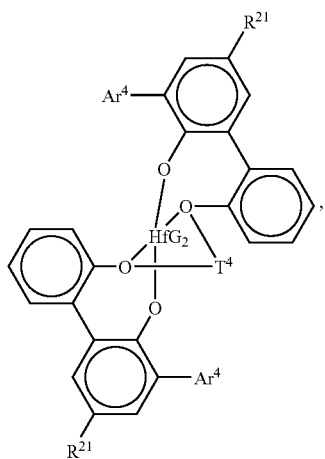

wherein $Ar^4$ is 3,5-di(isopropyl)phenyl, 3,5-di(isobutyl)phenyl, dibenzo-1H-pyrrole-1-yl, or anthracen-5-yl,
$R^{21}$ is hydrogen, halo, or $C_{1-4}$ alkyl, especially methyl
$T^4$ is propan-1,3-diyl or butan-1,4-diyl, and
G is chloro, methyl or benzyl.

A most highly preferred metal complex of the foregoing formula is:

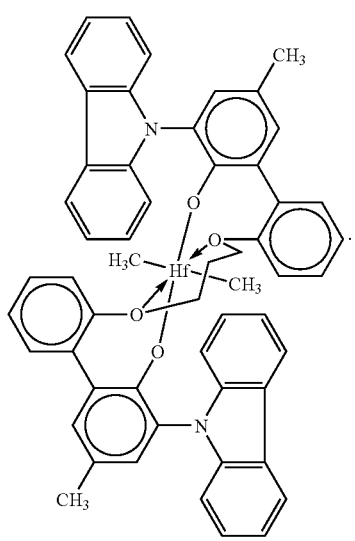

The foregoing polyvalent Lewis base complexes are conveniently prepared by standard metallation and ligand exchange procedures involving a source of the transition metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and US 04/0220050.

Cocatalysts for Unsaturated Polymer Reagent Synthesis

Generally the foregoing metal complexes are rendered active for olefin polymerization by contact with an activating cocatalyst. Suitable cocatalysts include those compounds previously known in the art for use with Group 4 metal olefin polymerization complexes. Examples of suitable activating cocatalysts include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. Nos. 5,153,157, 5,064,802, 5,321,106, 5,721,185, 5,350,723, 5,425,872, 5,625,087, 5,883,204, 5,919,983, 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable cation forming compounds useful as cocatalysts in one embodiment of the present invention comprise a cation which is a Bronsted acid capable of donating a proton and a compatible, noncoordinating anion, $A^-$. As used herein, the term "noncoordinating" means an anion or substance which either does not coordinate to the Group 4 metal containing precursor complex and the catalytic derivative derived there from, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

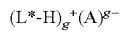

wherein:
L* is a neutral Lewis base;
(L*-H)$^+$ is a conjugate Bronsted acid of L*;
A$^{g-}$ is a noncoordinating, compatible anion having a charge of g-, and
g is an integer from 1 to 3.

More preferably A$^{g-}$ corresponds to the formula: [M'Q$_4$]$^-$; wherein:
M' is boron or aluminum in the +3 formal oxidation state; and
Q independently each occurrence is selected from hydride, dialkylamido, halide, hydrocarbyl, hydrocarbyloxide, halo-substituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is A$^-$. Activating cocatalysts comprising boron which are particularly useful in addition polymerizations may be represented by the following general formula:

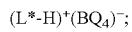

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more C$_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in addition polymerizations are
tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate,
dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;
di-substituted sulfonium salts such as:
di(o-tolyl)sulfonium tetrakis(pentafluorophenyl)borate, and
methylcotadecylsulfonium tetrakis(pentafluorophenyl)borate.

Preferred (L*-H)$^+$ cations are methyldioctadecylammonium cations, dimethyloctadecylammonium cations, and ammonium cations derived from mixtures of trialkyl amines containing one or 2 C$_{14-18}$ alkyl groups. A particularly preferred example of the latter compound is based on a commercially available long chain amine and is referred to as: bis-(hydrogenated tallowalkyl)methylammonium tetrakis(pentafluorophenyl)borate.

Another suitable ion forming, activating cocatalyst comprises a salt of a cationic oxidizing agent and a noncoordinating, compatible anion represented by the formula:

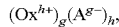

wherein:
Ox$^{h+}$ is a cationic oxidizing agent having a charge of h+;
h is an integer from 1 to 3; and
A$^{g-}$ and g are as previously defined.

Examples of cationic oxidizing agents include: ferrocenium, hydrocarbyl-substituted ferrocenium, Ag$^{+}$ or Pb$^{+2}$. Preferred embodiments of A$^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

wherein:
[C]$^+$ is a C$_{1-20}$ carbenium ion; and
A$^-$ is a noncoordinating, compatible anion having a charge of -1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

wherein:
Q$^1$ is C$_{1-10}$ hydrocarbyl, and A$^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

A class of cocatalysts comprising non-coordinating anions generically referred to as expanded anions, further disclosed in U.S. Pat. No. 6,395,671, may be suitably employed to activate metal complexes for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

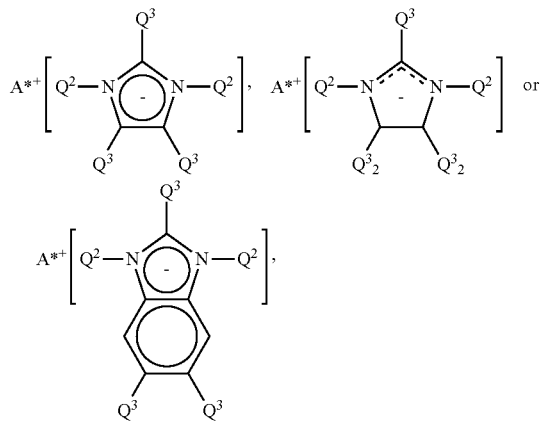

wherein:

A$^+$ is a cation, especially a proton containing cation, and preferably is a trihydrocarbyl ammonium cation containing one or two C$_{10-40}$ alkyl groups, especially a methyldi (C$_{14-20}$ alkyl)ammonium cation, Q$^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably C$_{1-20}$ alkyl, and Q$^2$ is tris(pentafluorophenyl)borane or tris(pentafluorophenyl)alumane).

Examples of these catalyst activators include trihydrocarbylammonium-salts, especially, methyldi(C$_{14-20}$ alkyl)ammonium-salts of:
bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris(2,2', 2"-nonafluorobiphenyl) fluoroaluminate. Combinations of activators are also contemplated, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in U.S. Pat. Nos. 5,849,852, 5,859,653, 5,869,723, EP-A-615981, and PCT publication WO 98/32775.

As previously mentioned, suitable activating cocatalysts include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, may be employed in lower quantity (<100:1) than the predominant catalyst literature, which is generally at least 100 times the quantity of metal complex on a molar basis, and more often around 1000 times this quantity. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1.

The remaining activating cocatalysts are generally employed in approximately equimolar quantity with the metal complex.

Polymer Metathesis Conditions

The metathesis is desirably conducted in the presence of ethylene or an ethylene forming compound present in an amount to provide approximately one equivalent of ethylene for each unsaturation in the reagent polymers, thereby forming terminally unsaturated reaction products, principally α,ω-dienes, of the desired molecular weight. Suitable conditions (metathesis conditions) include a temperature from 0 to 200° C., preferably from 20 to 50° C. and pressures from atmospheric to elevated, suitably from atmospheric to 3.0 MPa. A solvent, especially a saturated hydrocarbon may be employed or the reaction may be conducted in the solid state, at least initially, with initially formed cleavage products comprising the reaction medium.

Suitable metathesis catalysts for use in the metathesis include homogeneous ruthenium catalysts including first-generation Grubbs catalysts, exemplified by bis(tricyclohexylphosphine)-benzylidene ruthenium dichloride, and second-generation Grubbs catalysts, exemplified by tricyclohexylphosphine[1,3-bis(2,4,6-trimethylphenyl)-4,5-dihydroimidazol-2-ylidene][benzylidene]ruthenium dichloride. "First-generation and second-generation Grubbs catalysts," named for their principle inventor Robert H. Grubbs, are disclosed in WO 96/04289 and WO 02/083742 and references disclosed therein. First-generation and second-generation Grubbs catalysts tend to be relatively tolerant towards air, moisture, and are preferred for industrial usage.

More particularly, suitable catalysts for the metathesis that are known from the prior art include homogeneous and heterogeneous catalyst systems. In general, the catalysts suitable for the process are based on a transition metal from transition group 6, 7 or 8 of the Periodic Table, with preference being given to the use of catalysts based on Mo, W, Re and Ru. Examples of homogeneous catalyst systems generally include one or more transition metal compounds, optionally in combination with a cocatalyst which are capable of forming a catalytically active metal carbene complex, which is thought to be the active catalyst composition.

Such compositions are described, for example, in "Comprehensive Organometallic Chemistry", R. H. Grubbs, ed., Pergamon Press, Ltd., New York, Volume 8, page 499 ff. (1982). Specific catalyst/cocatalyst compositions based on W, Mo and Re may comprise, for example, at least one soluble transition metal compound and an alkylating agent. Examples include $MoCl_2(NO)_2(P(C_6H_5)_3)_2/Al_2(CH_3)_3Cl_3$, $WCl_6/BuLi$, $WCl_6/(C_2H_5)AlCl_2$ $(Sn(CH_3)_4)/C_2H_5OH$; $WOCl_4/Sn(CH_3)_4$; $WOCl_2(O-[2,6-Br_2—C_6H_3]/Sn(CH_3)_4$, and $CH_3ReO_3/C_2H_5AlCl_2$.

Further suitable catalysts include transition metal-alkylidene complexes in, Acc. Ch. Res., Volume 23, page 158 ff. (1990). In general, these complexes are tetracoordinated Mo- and W-alkylidene complexes additionally containing two bulky alkoxy ligands and one imido ligand. Examples include: $((CH_3)_3CO)_2Mo(=N-[2,6-(i-C_3H_7)_2C_6H_3])(=CH C(CH_3)_2(C_6H_3))$ and $[(CF_3)_2C(CH_3)O]2Mo(=N-[2,5-(i-C_3H_7)_2C_6H_3])$ $(=CHC(CH_3)_2(C_6H_5))$.

Additional suitable homogeneous metathesis catalysts are the catalysts described in Angew. Chem., 107, 2179 ff. (1995), in J. A. C. S., 118, 100 ff. (1996), and in J. Chem. Soc. Chem. Comm., 1127 ff. (1995). Examples include $RuCl_2(=CH (CH_3))(P(C_6H_5)_3)_2$, $RuCl_2(=CHC_6H_5)(P(C_6H_{11})_3)_2$, $(\eta^6\text{-p-cymene})RuCl_2(p(C_6H_{11})_3)$ and 3 molar equivalents of diazoalkane $((CH_3)_3SiCHN_2$ or $C_6H_5CHN_2)$.

Suitable heterogeneous catalyst systems generally comprise a transition metal compound on an inert support, said compound being capable without a cocatalyst of forming a catalytically active alkylidene complex by reaction with an olefin. Examples include $Re_2O_7$ and $CH_3ReO_3$. Suitable inorganic supports are metal oxides or metalloid oxides, especially silicon oxides and aluminum oxides, aluminosilicates, zeolites, carbides, nitrides, and mixtures thereof. Preferred supports are $Al_2O_3$, $SiO_2$ and mixtures thereof, in combination with $B_2O_3$ or $Fe_2O_3$ if desired.

Suitable metathesis conditions for use herein especially include sequential or simultaneous contacting of one or more metathesis catalysts with the unsaturated polymer reagents, desirably in the presence of a cyclic or alicyclic olefin or functionalized olefin, especially ethylene, and optionally a chain transfer agent. The metathesis may take place in the liquid phase, such as by use of solvents such as carbon dioxide (see, U.S. Pat. No. 5,840,820) or in melts of one or more polymers, or in a solid state process, and does not require that polymers be completely miscible or soluble at all times during the process. The unsaturated polymer reagents can be synthesized in parallel or series with the present metathesis in one or more bulk, solution, slurry, suspension, gas phase, or other polymerization reactors, either as one unit operation of the present process or separately. In one embodiment, the polymer reagent for the present metathesis is coproduced concurrently with the metathesis, and subjected to metathesis without recovery or isolation, thereby avoiding the need for remelting, dissolution and/or blending of the unsaturated polymer reagent. Highly desirably, the temperature and reaction medium are chosen so that the unsaturated polymer is molten or sufficiently solubilized to provide a fluid reaction medium.

In general temperatures from 20 to 120° C., in particular from 40 to 80° C. are employed for the metathesis. The reaction is preferably conducted at an increased pressure from 0.2 to 2.0 MPa, preferably from 0.3 to 1.5 MPa, in particular from 0.4 to 1.2 MPa.

Suitable reaction apparatuses are known to the skilled worker and are described, for example, in Ullmanns Enzyklopädie der technischen Chemie, Volume 1, page 743 ff. (1951). They include, for example, stirred vessels for use in batch processes and tubular reactors for use in continuous processes.

The molecular weight of the resulting diene products may range from as low as 100 g/mole, and as high as 10,000 g/mole. The polydispersity (Mw/Mn) is dependent on the polydispersity and functionality of the parent polymer and the degree of metathesis. Suitable ranges of Mw/Mn for the resulting polymer products are from 1.5 to 100, and preferably from 1.8 to 10.

The fraction of saturated or monounsaturated compounds in the product mixture may be characterized by any suitable analytical technique, such as IR or NMR analysis. In general, the quantity of such undesired components ranges from 0 to 1 percent, preferably from 0 to 0.5 percent.

Metathesis Conditions

Once prepared, the unsaturated polymers are contacted with the metathesis catalyst under conditions to cause olefin cleavage and rearrangement of the cleavage products. The various catalyst compositions that have been found to be effective in promoting olefin metathesis reactions or ring-opening polymerizations of unsaturated cyclic monomers are also effective catalyst compositions for promoting the processes of the present invention. These catalyst compositions may be either heterogeneous or homogeneous with the former having the advantage of being more readily removable from the reaction products while the latter are generally more efficient from the standpoint of catalytic activity.

Examples of suitable catalyst compositions include organic or inorganic derivatives of transition metals selected from Groups 5-10, preferably molybdenum, tantalum, tungsten, ruthenium, or rhenium, either in the form of solids, dispersions, suspensions, solutions, or neat. In the solid form, the catalyst or the individual components thereof may be supported on the surface of an inert carrier or support, such as a high surface area metal oxide, metalloid oxide, metal carbide, metal boride, metal nitride, zeolite or clay. Preferred compounds include ruthenium, molybdenum or tungsten compounds or complexes, especially halides, oxyhalides, tetraorganoammonium tungstates, tetraorganoammonium molybdenates, Lewis base derivatives thereof, and mixtures of the foregoing.

Examples of suitable homogeneous catalyst compositions employed in the practice of this invention include those previously disclosed in U.S. Pat. No. 4,010,224, especially compositions comprising: (A) at least one organometallic compound wherein the metal is selected from Groups 1, 2, 12 or 13 of the Periodic Table of Elements, (B) at least one metal derivative wherein the metal is selected from the group consisting of metals of Groups 5, 6, or 7, especially molybdenum or tungsten and, optionally, (C) at least one chelating- or Lewis base-material. Examples of the latter compounds include ethers, carboxylic acid esters, ketones, aldehydes, carbonates, nitriles, alcohols, thiols, water, and mixtures thereof.

Representative examples of organometallic compounds from which component (A) may be selected include lithium, sodium, potassium, rubidium, cesium, beryllium, magnesium, calcium, strontium, barium, zinc, cadmium, aluminum, gallium, indium, and thallium compounds, with lithium, sodium, magnesium, aluminum, zinc and cadmium compounds being preferred and with aluminum compounds being most preferred.

Representative examples of organometallic compounds useful as catalyst component (A) are organoaluminum compounds having at least one aluminum-to-carbon bond. Representative of such compounds are tri($C_{1-10}$)hydrocarbylaluminum compounds such as trimethylaluminum, triethylaluminum, tri-n-propylaluminum, tri-n-butylaluminum, triisopropylaluminum, triisobutylaluminum, trihexylaluminum, trioctylaluminum, tritolylaluminum, tribenzylaluminum, and triphenylaluminum; organoaluminum halides such as diethylaluminum chloride, di-n-propylaluminum chloride, diisobutylaluminum chloride, diethylaluminum bromide, diethylaluminum iodide and diethylaluminum fluoride, ethylaluminum dichloride, ethylaluminum sesquichloride, ethylaluminum dibromide, propylaluminum dichloride, isobutylaiuminum dichloride, ethylaluminum diiodide, phenylaluminum dibromide, tolylaluminum dibromide, benzylaluminum dibromide, phenylaluminum diiodide, tolylaluminum diiodide, benzyl aluminum diiodide, diphenylaluminum chloride, ditolylalumium chloride, and dibenzylaluminum bromide; organoaluminum hydride compounds such as diphenylaluminum hydride and phenylaluminum dihydride; and mixtures of the foregoing.

Additional suitable organometallic compounds are alkali metal compounds such as ethyllithium, n-butyllithium, t-butyllithium, amylsodium, butylpotassium, phenylpotassium, phenylsodium, phenyllithium, lithium-aluminum tetrabutyl, lithium-aluminum tetraethyl, lithium-aluminum triethyl chloride, and sodium aluminum tetraethyl; alkaline earth metal compounds such as diphenylmagnesium, diethylmagnesium, ethylmagnesium chloride, phenylmagnesium chloride, butylmagnesium bromide, butyl calcium chloride, and diethylbarium; Group 12 organometal compounds such as diethylzinc, diphenylzinc, ethylzinc chloride, diethylcadmium, and dibutyl-cadmium; phenylmagnesium bromide, butylmagnesium chloride, butylmagnesium bromide, and ethylmagnesium chloride; and mixtures of the foregoing compounds. Preferred compounds for use as component (A) are trialkylaluminums, dialkylaluminum halides, alkylaluminum dihalides and aluminumsesquihalides, containing up to 4 carbons in each alkyl group.

Suitable derivatives of molybdenum and tungsten useful as component (B) of the metathesis catalyst include the corresponding halides-, acetylacetonates-, sulphates-, phosphates-, nitrates-, and alcoholates. Examples include: chlorides, bromides, iodides and fluorides, such as molybdenum pentachloride, tungsten hexachloride, molybdenum pentabromide, tungsten hexabromide, molybdenum pentaiodide, molybdenum pentafluoride, molybdenum hexafluoride and tungsten hexafluoride. Other examples include molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these compounds may also be employed. The tungsten- and molybdenum halides, representative of which are tungsten hexachloride and molybdenum pentachloride, are especially preferred.

Suitable compounds for use as component (C) of the catalyst composition are compounds of the general formula R—Y—H wherein Y is selected from the group of oxygen and sulfur and wherein R is hydrogen, or a hydrocarbyl or substituted hydrocarbyl group having up to 20 carbons total, and wherein the substituent(s) on the hydrocarbyl group are selected from the group consisting of hydroxy, thio, hydrocarbyloxy, hydrocarbylthio, oxy- and sulfo-. Examples include water, hydrogen sulfide, alkanols, aromatic alcohols, mercaptans, hydrocarbylperoxides, polyalcohols, polymercaptans, hydroxy mercaptans, alkanolethers, alkanolthioethers, mercaptoethers and mercaptothioethers. Representative examples of the materials for use as component (C) include alcohols such as methanol, ethanol, isopropanol, tertiarybutyl alcohol, amyl alcohol, benzyl alcohol, allyl alcohol, 1,1-dimethyl benzyl alcohol, phenol, tertiarybutyl catechol, cresol, alpha and beta naphthyl alcohol; mercaptans such as methyl-, ethyl-, propyl-, isopropyl-, butyl-, amyl- or allylmercaptan, thiophenol, 4-methylthiophenol, or 4-mercaptophenol; hydroperoxides, such as, cumyl hydroperoxide, tertiarybutyl hydroperoxide; hydrodisulfides such as cumyl hydrodisulfide, and s-butyl hydrodisulfide; polyalcohols, such as ethylene glycol, glycerol, polyethyleneglycol, catechol, resorcinol, hydroquinone, pyrogallol; polymercaptans, such as 1,3-propane dithiol, 1,4-dithiobenzene; and hydroxy mercaptans, such as, 1-hydroxy-2-thioethane or 1-hydroxy-4-thiobenzene.

The quantity of component (C) employed in the foregoing catalyst composition is adjusted to control the activity of the catalyst composition. Generally, the catalyst composition exhibits higher activity when the quantity of component (C) employed is relatively small, including none.

Generally the quantities of the respective catalyst components are adjusted to be within a molar ratio of (B)/(C) ranging from 0.3/1 to 20/1 and the molar ratio of (A)/(B) is within the range of 0.5/1 to 15/1. More preferred ratios of (B)/(C) are from 0.5/1 to 5/1 and (A)/(B) from 0.5/1 to 8/1. Still more preferred ratios of (B)/(C) are 1/1 to 2/1 and (A)/(B) are 0.75/1 to 5/1.

The foregoing catalyst compositions may be prepared by mixing the components by known techniques, either prior to combination with the olefin containing polymer or "in situ". By the "preformed" method the catalyst components are mixed together prior to exposure of any of the catalyst components to the olefin containing polymer to be used in the process of this invention. In the "in situ" method the catalyst components are added separately to the reaction mixture containing the unsaturated polymer to be subjected to metathesis. The catalyst components may be mixed either as pure compounds or as suspensions or solutions in liquids which do not adversely affect the catalyst activity of the olefin metathesis reaction. Representative of such liquids are saturated hydrocarbons such as hexane, pentane, benzene, toluene or mixtures thereof.

The order of addition of the three catalyst components to each other may be varied. All of the following practices may suitably be employed:

1. simultaneous addition of components (A), (B) and (C);
2. sequential addition of components (A), (B) and (C) in any order;
3. contacting of any two components, optionally with recovery or purification of the reaction product, followed by addition of the binary product to the remaining component; or
4. contacting of mixtures of any two components with subsequent contact of the resulting binary mixtures or reaction products, whether purified or unpurified.

The amount of catalyst employed in the reactions of this invention may be varied over wide concentrations and has not been found to be critical. The optimum amount of catalyst composition employed depends upon a number of factors such as temperature, purity of reactants, molecular weight of the resulting product, and the desired reaction time. Desirably, the amount of catalyst employed (based on quantity of component (B)) is from 0.01 to 1 percent based on the weight of unsaturated polymer reagent employed.

In one preferred embodiment, the catalyst composition comprises at least one organoaluminum halide and at least one tungsten derivative. Preferred organoaluminum halides are dialkylaluminum chloride, di-n-propylaluminum chloride, diisobutyolaluminum chloride, diethylaluminum bromide, diethylaluminum iodide, diethylaluminum fluoride, ethylaluminum sesquichloride, ethylaluminum sesquibromide, ethylaluminum dichloride, ethylaluminum dibromide, propylaluminum dichloride, isobutylaluminum dichloride, ethylaluminum diiodide, phenylaluminum dibromide, tolylaluminum dibromide, benzylaluminum dibromide, phenylaluminum diiodide, tolylaluminum diiodide, benzylaluminum diiodide, diphenylaluminum chloride, ditolyl aluminum chloride, dibenzylaluminum bromide, and mixtures of the foregoing.

Preferred tungsten derivatives include halides-, sulfates-, phosphates-, nitrates- and carboxylates- of tungsten in the +4 or +6 oxidation state, preferably tungsten hexachloride, tungsten hexabromide, tungsten hexaiodide, tungsten hexafluoride, tungsten diphosphate, tungsten hexanitrate, tungsten triacetylacetonate, tungsten oxychloride, and tungsten trisulphate. A most preferred tungsten derivative is tungsten hexachloride.

The molar relationship between the two catalyst components in this embodiment are generally from 0.5/1 to 15/1, more preferably from 0.7/1 to 8/1, and a still more preferably from 0.8/1 to 5/1. The catalyst components may be reacted together as pure compounds or in solutions or suspensions in inert, aliphatic or aromatic liquids. Representative of such liquids are pentane, hexane, benzene, and toluene. The catalyst is desirably employed in an amount (based on weight of component (B)) from 0.01 to 1 percent based on weight of unsaturated polymer.

A third catalyst composition that is effective in promoting the present metathesis process comprises an aluminum trihalide and an organic or inorganic derivative of a Group 5, 6 or 7 compound, preferably a tungsten compound, especially those wherein the tungsten is in an oxidation state from 4 to 6. The preferred aluminum trihalides are aluminum trichloride or aluminum tribromide. Preferred tungsten compounds are tetra-, penta- and hexa-chlorides, bromides, and iodides, tungsten hexafluoride and the tungsten oxychlorides. Optionally an organometallic compound may be present in the catalyst composition as an aid in the suppression of gel formation and in order to increase polymerization rates at lower catalyst levels. Examples of suitable optional organometallic compounds include alkyl-, aryl-, and alkaryl derivatives of lithium, sodium, magnesium, calcium, strontium and barium; alkylhalide-, arylhalide-, and alkarylhalide derivatives of magnesium, calcium, strontium or barium and alkyl-, aryl- or alkaryl-derivatives of Group 12 metals such as dialkyl- and diarylzinc, said alkyl, aryl or alkaryl group having up to 10 carbons.

Other classes of catalysts which are effective in promoting the polymerizations of this invention are those disclosed in U.S. Pat. No. 4,994,535, and generally include an organometal derivative of a Group 13-14 metal, especially organo- or organohalo-derivatives of aluminum or tin, preferably tetraalkyl tin, trialkyl aluminum and dialkylaluminum halides, containing up to 10 carbons in each alkyl group; at least one derivative of a Group 5, 6, or 7 metal, especially molybdenum or tungsten; and optionally, a chelating agent, such as a Lewis base.

Additional suitable metathesis catalysts for use in the present invention are ruthenium or osmium complexes such as those disclosed in U.S. Pat. Nos. 6,838,489, 6,818,586, 6,806,325, 6,624,265, 6,313,332, 5,977,393, 5,917,071, 5,710,298, 5,750,815, 5,728,917, 5,312,940, and 5,342,909. Examples of the foregoing metathesis catalysts include ruthenium and osmium carbene complexes possessing metal centers that are formally in the +2 oxidation state, have an electron count of 16, and are penta-coordinated. These complexes are of the general formula:

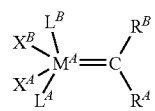

wherein:

$M^A$ is ruthenium or osmium;

$X^A$ and $X^B$ are the same or different anionic ligands, preferably chloride;

$L^A$ is a neutral electron donor ligand;

$L^B$ is a neutral electron donor ligand or a nitrogen containing heterocyclic carbene; and $R^A$ and $R^B$ are independently each occurrence hydrogen, or an alkyl, alkenyl, alkynyl, aryl, carboxylate, alkoxy, alkenyloxy, alkynyloxy, aryloxy, alkoxycarbonyl, alkylthio, alkylsulfonyl, alkylsulfinyl, or silyl group of up to 20 atoms not counting hydrogen, an alkyl, alkoxy, aryl, aralkyl, haloalkyl, haloalkoxy, haloaryl or haloalkaryl substituted derivative thereof; or a functionalized derivative of any of the foregoing wherein the functional group is hydroxyl, thiol, alcohol, sulfonic acid, phosphine, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, or halogen.

In a preferred embodiment, the metal complexes are ruthenium derivatives wherein $L^B$ is a tertiary phosphine, especially triphenylpsphine, and $L^A$ is either a tertiary phosphine or a nitrogen containing heterocyclic ligand, especially an imidazolidinyl- or triazolyl-ligand of the formula:

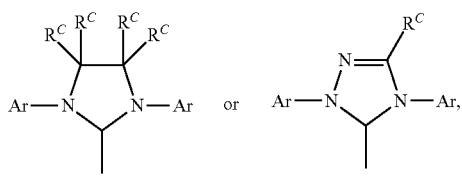

wherein Ar independently each occurrence is an aryl group, especially phenyl or 2,4,6-trimethylphenyl, and $R^C$ independently each occurrence is hydrogen or an anionic ligand group or multiple $R^C$ groups collectively may form one or more rings that are fused to the imidazolidine ring.

The inclusion of an imidazolidinyl or triazoyl ligand to the previously described ruthenium or osmium catalysts improves the properties of the complexes in olefin metathesis processes. In particular, the catalysts maintain the general functional group tolerance towards olefins of ruthenium-phosphine complexes while possessing enhanced metathesis activity comparable to tungsten- and molybdenum-salt ternary compositions. Such catalysts (referred to as Grubbs II catalysts) are particularly desired for metathesis of polar group containing polymers.

The operating conditions which are employed in the processes of this invention may vary. The reactions can be conveniently carried out in a liquid form, including in a melt or in solution. Solvents which can be used when solution conditions are employed include any inert liquid that dissolves or swells the polymers employed. Convenient solvents are aliphatic, aromatic or cycloaliphatic hydrocarbons which do not themselves inhibit or interfere with the metathesis reaction, such as pentane, hexane, benzene, toluene, and cyclohexane. When one or more of the olefin reactants is a liquid, the reaction can be conducted in bulk, that is, in the absence of a separately added solvent.

In the presence of an olefin or cycloolefin, especially ethylene or an ethylene generating compound (ethenolysis), a liquid reaction mixture quickly forms due to depolymerization of the starting polymer. Generally, the quantity of olefin employed is from 0.5 to 100 moles, preferably from 0.5 to 50 moles, per mole of polymer. In general, ethylene is the preferred olefin due to its reactivity and efficiency in preparing reduced molecular weight products.

Metathesis process conditions may vary widely over any operable conditions suitable for preparing the polymer compositions of this invention. Any temperature below the decomposition temperatures of the reactant polymers, product polymer(s), and metathesis catalyst, and preferably below the normal boiling point of any solvent or diluent, if used, is generally suitable. When the metathesis is conducted in a neat polymer melt, the process temperature may broadly range from about 100° C. up to about 350° C., depending upon the decomposition temperatures as noted hereinbefore. Generally, a temperature of about 20° C. to 50° C. above the polymer melt or glass transition temperature is preferred. When the metathesis is conducted with the reactant polymers dissolved in a liquid diluent or solvent, the temperature may typically range from about 25° C. up to about 180° C. Preferred temperatures for use with the preferred Grubbs catalysts range from about 35° C. up to about 100° C., more preferably, up to about 85° C. Typically, a process pressure ranging from about 14 psia (96.5 kPa) to about 500 psia (3447 kPa) is suitable. Samples may be taken from the reaction mixture and analyzed via $^1$H NMR or gas phase chromatography (GPC), for example, to determine when the acceptable conversion is reached.

Once the metathesis has proceeded to the extent desired, preferably to equilibrium, the catalyst may be inactivated, and if desired, the resulting polyolefinic product recovered. If desired the product may be partially hydrogenated to adjust residual unsaturation, especially vinyl content. Suitable methods of inactivating the metathesis catalyst include reaction with water; an alcohol; a carboxylic acid, or a metal salt or ester derivative thereof; or carbon monoxide. The resulting catalyst residue may be removed from the polymer by filtration, solvent extraction, or other suitable technique, or may be left in the polymer. Suitable hydrogenation catalysts include those previously known in the art, especially noble metal catalysts such as platinum or palladium containing compounds or complexes.

Metathesis Products

The diolefin products of the invention comprise a random distribution of molecular weights and preferably a most probable distribution of molecular weights. The term "random" as used herein refers to an outcome falling within the metes and bounds of this invention that follows and/or arises from no describable deterministic pattern. Metathesis processes are random processes in that where ethylenic bonds in an unsaturated polymer cleave and how the resulting molecular fragments reform into new ethylenic bonds are not predictable and do not follow predetermined rules. If the parent unsaturated polymers have branching, the resulting polymer products from the metathesis reaction likewise possess branching. A diverse range of branched architectures is possible for the resulting copolymers, including stars, combs, random tri-functional branches, random tetra-functional branches, and so forth. Preferred products are highly linear with primarily terminal unsaturation.

The number and position of the ethylenic unsaturation in the polymers may be influenced by the reaction conditions, especially the catalyst choice, in order to control vinyl functionality. Preferred polymers have primarily terminal unsaturation with an iodine number of at least 250, preferably at least 300 g $I_2$/100 g. The polymers preferably have Mn from 500 to 5,000 g/mole, preferably from 550 to 3,000 g/mole.

If hydroformylation due to reaction with carbon monoxide to form the corresponding aldehyde or reductive hydroformylation, involving reaction with carbon monoxide and hydrogen, is conducted, the separate inactivation of the metathesis catalyst is often not necessary. The hydroformylation may be conducted according to known parameters. Generally, a catalyst such as cobalt carbonyls or rhodium complexes is employed. Examples include tricarbonylhydrocobalt, dicobalt octacarbonyl, rhodium dicarbonyl (2,4-pentanedionate) (tri-n-octylphosphine) complex, and hydridocarbonyl (trisphenylphosphine)rhodium.

Alcohols are obtained by continuing the hydroformylation after consumption of carbon monoxide under reducing conditions, especially in the presence of a hydrogenating agent such as borohydrides, especially sodium tetrahydroboranate, or hydrogen. Instead of reductive hydroformylation, reductive amination to form amines, oxidation to form carboxylic acids, aldol condensation or other process may be employed concurrently or subsequently with the hydroformylation. Preferred conditions for the foregoing processes employ pressures from atmospheric to superatmospheric, generally from 0.2 to 4.0 MPa, and temperatures from 50 to 150° C. Suitable conditions for hydroformylation are disclosed in *J. Am. Chem. Soc.* 85, 886 (1963) and EP-A-502,839.

The resulting polyols desirably have a hydroxyl number (OHN) of from 200 to 2500, in particular from 250 to 2000 with Mn from 500 to 5000 g/mole, preferably from 550 to 3000 g/mole. The polydispersity (Mw/Mn) desirably is from 1.5 to 10, preferably from 1.8 to 5.

The skilled artisan will readily appreciate that functionalized products may be produced directly from the metathesis by use of a functionalized olefin chain terminating agent according to known teachings in the art. Examples of such terminating agents include 2-butene-1,4-diol and derivatives thereof, especially the diacetate or dibenzyl ether derivatives.

The recovered products may be employed in the form produced by the hydroformylation or other process, purified by filtration, extraction, distillation or other suitable technique to remove reaction by-products (primarily aldehydes, acetals, polymers and Tishchenko reaction products) as well as spent catalyst residues. Use of the resulting product mixture to produce valuable products such as polyurethanes, polyesters, epoxies, surfactants, paints, varnishes and other coatings is conducted according to well known processes, optionally employing a catalyst. For example, suitable techniques for polyurethane production are disclosed in *J. Chem. Soc. C,* 1967, 2663; *J. Chem. Soc. C,* 1968, 1479; *J. Chem. Soc, Perkin Trans,* 2, 1029 (1985); *Synthesis,* 1989, 131, and elsewhere.

EXAMPLES

It is understood that the present invention is operable in the absence of any component which has not been specifically disclosed and may be combined with any other suitable reaction or process in a multistep system design. The following examples are provided in order to further illustrate the invention and are not to be construed as limiting. Unless stated to the contrary, all parts and percentages are expressed on a weight basis.

Unsaturated Reagent Polymers

Butadiene Copolymer Polymerizations Copolymerizations of ethylene or mixtures of ethylene and 1-octene with butadiene are conducted in a computer controlled 2 L Parr batch reactor, which is heated by an electrical heating mantle and cooled by an internal serpentine cooling coil with chilled water. The bottom of the reactor is fitted with a stainless steel ball valve which empties the reactor contents into a stainless steel vessel containing a toluene solution of a standard stabilizer and antioxidant. The polymer mixture is purged with nitrogen for 20 minutes after discharge into the collection vessel.

All chemicals and catalysts are manipulated in a nitrogen-filled dry box. The 1-octene, butadiene and mixed hexanes solvent (Isopar™ E, available from ExxonMobil Chemicals, Inc.) are purified by passage through alumna (8×14 A2 alumna, available from UOP Corporation) then a catalyst (Q5™ reactant, available from Engelhard Corporation). Ethylene is passed through a first column containing alumina (A204™ available from LaRouch, Inc.) followed by 0.4 nm molecular sieves and then through a second column containing Q5™ reactant. The nitrogen used for all transfers is passed through a single column containing A204 alumna, 0.4 nm molecular sieves and Q5™ reactant.

The reactor is charged from a shot tank containing a pre-weighed quantity of mixed alkanes and 1-octene (if used). The shot tank is filled to the desired level by use of a laboratory scale upon which the tank is mounted. Butadiene is loaded using a computer operated controller (Emerson Micro Motion™ controller). After solvent, butadiene and optional 1-octene addition, the reactor is heated to the polymerization temperature and ethylene is added to achieve the desired pressure of 3.4 MPa.

The catalyst ((t-butylamido)dimethyl(1H-cyclopenta[l]-phenanthrene-2-yl)silane titanium(IV)dimethyl, prepared according to U.S. Pat. No. 6,150,297), triethyl aluminum scavenger and activator (methyldi(octadecyl)ammonium tetrakis(pentafluorophenyl)borate) are combined in the stated order in toluene under nitrogen atmosphere. This mixture is drawn into a syringe and pressure transferred into the catalyst shot tank, followed by three 5 mL rinses of toluene. After charging the catalyst solution to the reactor, ethylene is supplied on demand at 3.4 MPa until the reaction is terminated.

Polymerizations are conducted for 10 minutes and then the reactor contents are discharged to the collection vessel. After purging with nitrogen, the polymer solution is poured into a tray and placed in a lab hood overnight to evaporate solvent. The trays are then transferred to a vacuum oven and heated at 145° C. under reduced pressure to remove any remaining solvent.

A poly(ethylene-co-butadiene-co-octene) is so prepared having an Mn of 8839 g/mol, an ethylenic unsaturation level of 0.38 mole percent, and a Tm of −54.3° C.

Example 1

Figure 2:
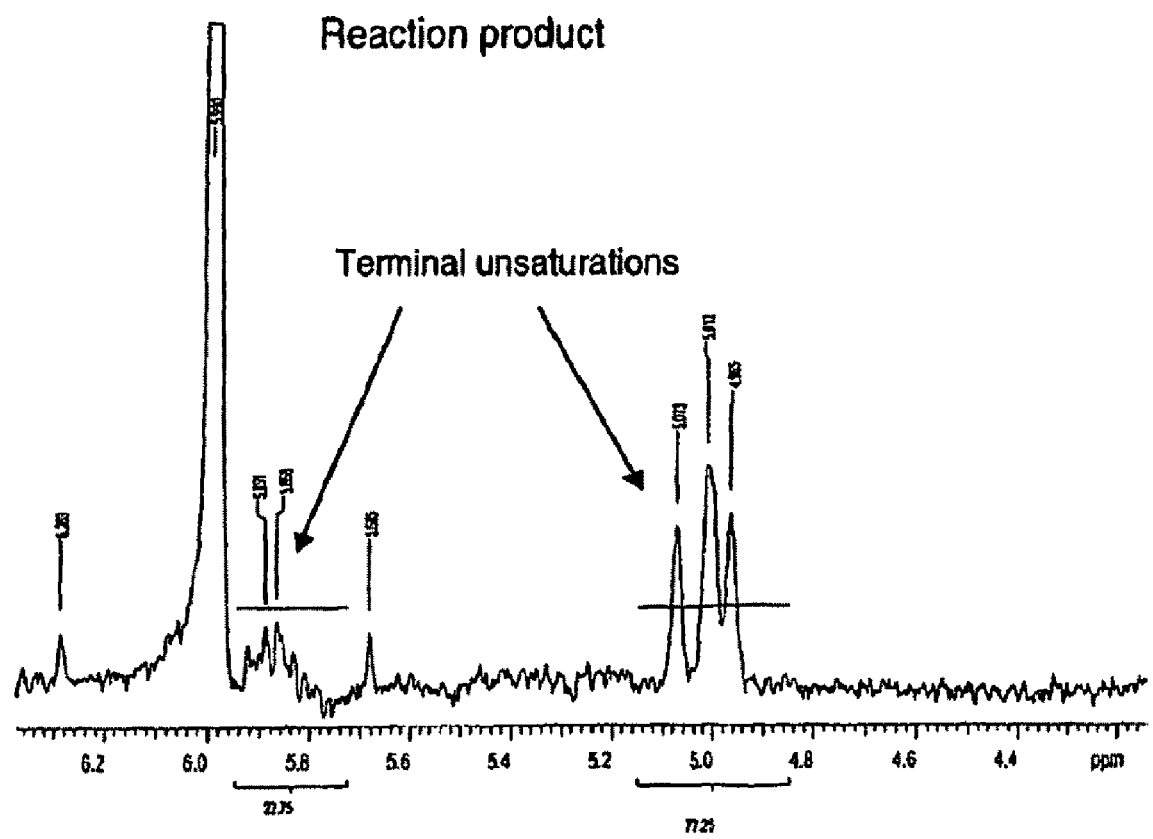
FIG. 2 is an $^1$H NMR spectrum of a telechelic composition of this invention prepared in the metathesis process described in Example 1.

A toluene solution containing 2.5 g poly(ethylene-co-octene-co-butadiene) prepared hereinabove is warmed to 85° C. and stirred at that temperature until the polymer is completely dissolved. An $^1$H NMR spectrum of this starting copolymer is shown in FIG. 1. To the stirred solution are added 0.288 g of propyl acetate and a toluene mixture of 0.192 g tungsten (VI) oxychloride and 0.286 g ethylaluminum dichloride. The reactor vessel is filled with 55 psig (379 kPa) ethylene and vented a total of three times. The reaction mixture is stirred under 55 psig (379 kPa) ethylene for 24 hours. An additional amount of propyl acetate, tungsten (VI) oxychloride and ethylaluminum dichloride are added as stated above and the reaction mixture stirred under 55 psig (379 kPa) ethylene for another 5 hours. A product is precipitated from the cooled solution by the addition of methanol and recovered by filtration. Removing volatile components under reduced pressure gives 2.4 g of product. GPC analysis of the reaction mixture reveals that the starting polymer Mn is reduced via ethenolysis to an Mn of 2,833 g/mole. Analysis by $^1$H NMR, as shown in FIG. 2, confirms that backbone unsaturation at 5.5 ppm is substantially decreased and terminal unsaturation is increased in the range 4.9 to 5.1 ppm and 5.8 to 5.9 ppm.

The terminal ethylenic unsaturation can be converted into other terminal functionality, for example, epoxide functionality via epoxidation of carbon-carbon double bonds; into hydroxymethyl functionality via hydroformylation and reduction of carbon-carbon double bonds; and into aminomethyl functionality via hydroformylation and amination of carbon-carbon double bonds.

More specifically, the polymer product (20 g) prepared by ethenolysis is loaded into a reactor (3.8 l autoclave) and pressurized with 1.7 MPa synthesis gas (molar ratio 2/1H$_2$/CO), 1 L toluene, and 1.1 g hydroformylation catalyst [Rh(CO)$_2$(2,4-pentanedionate)] and tri-n-octylphosphine. The final reactor solution contains 800 ppm rhodium and a tri-n-octylphosphine to Rh molar ratio of 4.5/1. The reactor is pressured to 5.5 MPa with the synthesis gas and heated to 90° C. for 4 hours. The reactor is then cooled and its contents discharged into a container, where a product is precipitated by addition of 1.5 liters of methanol. The product is recovered by filtration, washed with acetone, and dried. Analysis of the product by proton NMR in chlorobenzene solution shows greater than 90 percent conversion of olefin groups to primary alcohol groups by reductive hydroformylation. The product comprises a low molecular weight polyol having a hydroxyl number of 2.1 and Mn of 950.

The invention claimed is:

1. A process for preparing a product mixture comprising ethylenically unsaturated telechelic polymers, the steps of the process comprising contacting a metathesis catalyst under polymer metathesis conditions with a composition comprising the unsaturated copolymer formed by addition polymerization of ethylene, a conjugated diene or alkyne, and one or more $C_{3-20}$ α-olefins, said metathesis being conducted in the presence of a cyclic olefin or polyolefin, an acyclic olefin, and/or a chain transfer agent, and recovering the resulting telechelic reaction product.

2. A process for preparing a product mixture comprising functionalized telechelic polymers, the steps of the process comprising:
   i) forming a mixture comprising ethylenically unsaturated telechelic polymers by contacting an unsaturated copolymer formed by addition polymerization of ethylene, a conjugated diene or alkyne, and optionally one or more $C_{3-20}$ α-olefins, with a metathesis catalyst under polymer metathesis conditions in the presence of a cyclic olefin or polyolefin, an acyclic olefin, and/or a chain transfer agent, to form a polyunsaturated reaction product;
   ii) converting some or all of the ethylenic unsaturation in the polyunsaturated reaction product to one or more functional groups; and
   iii) recovering the resulting functionalized telechelic reaction product.

3. A process according to claim 2 for preparing a product mixture comprising a polyol, the steps of the process comprising:
   i) forming a mixture comprising ethylenically unsaturated telechelic polymers by contacting an unsaturated copolymer formed by addition polymerization of ethylene, a conjugated diene or alkyne, and optionally one or more $C_{3-20}$ α-olefins, with a metathesis catalyst under polymer metathesis conditions in the presence of a cyclic olefin or polyolefin, an acyclic olefin, and/or a chain transfer agent, to form a polyunsaturated reaction product; and
   ii) hydroformylating some or all of the ethylenic unsaturation in the polyunsaturated reaction product from step i) under reductive hydroformylation conditions to form a hydroxy-functionalized telechelic reaction product comprising a polyol; and
   iii) recovering the resulting hydroxy-functionalized telechelic reaction product.

4. A telechelic polymer comprising ethylenic unsaturation prepared from the metathesis of poly(ethylene-co-octene-co-butadiene) and ethylene according to a process comprising contacting a metathesis catalyst under polymer metathesis conditions with a composition comprising the poly(ethylene-co-octene-co-butadiene) and ethylene, and recovering the resulting telechelic polymer.

5. A process for the preparation of a polyurethane composition by reaction of a diisocyanate compound with a polyol, characterized in that the polyol comprises a telechelic polymer prepared according to the process of claim 3.

6. A process according to claim 1 wherein the unsaturated polymer reagent subjected to metathesis comprises from 0.001 to 10 mole percent ethylenic unsaturation.

7. A process according to claim 6 wherein the unsaturated polymer is a copolymer of ethylene and butadiene, and one or more $C_{3-8}$ olefins, or a partially hydrogenated derivative thereof.

8. A process according to claim 7 wherein the unsaturated polymer contains from 0.1 to 1 mole percent ethylenic unsaturation.

9. A process according to claim 1 wherein the metathesis is conducted in the presence of a catalyst comprising (A) at least one organometallic compound wherein the metal is selected from Groups 1, 2, 12 or 13 of the Periodic Table of Elements, (B) at least one metal derivative wherein the metal is selected from the group consisting of metals of Groups 5, 6, or 7 of the Periodic Table of Elements and, optionally, (C) at least one chelating- or Lewis base-material.

10. A process according to claim 1 wherein the metathesis is conducted in the presence of a catalyst comprising a compound of the general formula:

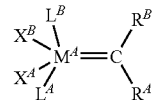

wherein:
$M^A$ is ruthenium or osmium;
$X^A$ and $X^B$ are the same or different anionic ligand;
$L^A$ is a neutral electron donor ligand;
$L^B$ is a neutral electron donor ligand or a nitrogen containing heterocyclic carbene; and
$R^A$ and $R^B$ are independently each occurrence hydrogen, or an alkyl, alkenyl, alkynyl, aryl, carboxylate, alkoxy, alkenyloxy, alkynyloxy, aryloxy, alkoxycarbonyl, alkylthio, alkylsulfonyl, alkylsulfinyl, or silyl group of up to 20 atoms not counting hydrogen, an alkyl, alkoxy, aryl, aralkyl, haloalkyl, haloalkoxy, haloaryl or haloalkaryl substituted derivative thereof; or a functionalized derivative of any of the foregoing wherein the functional group is hydroxyl, thiol, alcohol, sulfonic acid, phosphine, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, or halogen.

11. A process according to claim 10 wherein the catalyst comprises a ruthenium derivative wherein $L^B$ is a tertiary phosphine, and $L^A$ is either a tertiary phosphine or a nitrogen containing heterocyclic ligand.

12. A process according to claim 11 wherein $L^A$ is an imidazolidinyl- or triazolyl- ligand of the formula:

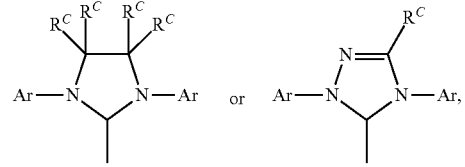

wherein Ar independently each occurrence is an aryl group of up to 50 atoms, and
$R^C$ independently each occurrence is hydrogen or an anionic ligand group or multiple $R^C$ groups collectively may form one or more fused rings.

13. A process according to claim 12 wherein Ar independently each occurrence is phenyl or 2,4,6-trimethylphenyl.

14. A process according to claim 1 wherein ethylene is present during the metathesis.

* * * * *